(12) United States Patent
Hayashi et al.

(10) Patent No.: US 7,050,244 B2
(45) Date of Patent: May 23, 2006

(54) ZOOM LENS BARREL

(75) Inventors: Shigeo Hayashi, Okaya (JP); Hidenori Akita, Machida (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/008,511

(22) Filed: Dec. 9, 2004

(65) Prior Publication Data
US 2005/0162752 A1    Jul. 28, 2005

(30) Foreign Application Priority Data
Dec. 24, 2003  (JP)  ............................. 2003-427953
Nov. 10, 2004  (JP)  ............................. 2004-326873

(51) Int. Cl.
G02B 15/14    (2006.01)
G02B 7/02     (2006.01)
G03B 17/00    (2006.01)
G03B 17/04    (2006.01)

(52) U.S. Cl. ...................... 359/701; 359/700; 359/699; 359/698; 359/823; 359/826; 359/704; 396/55; 396/72; 396/348; 396/349

(58) Field of Classification Search ................ 359/823, 359/826, 819, 830, 695, 698, 699, 700, 701, 359/704; 396/48, 55, 72, 73, 301, 303, 348, 396/349; 348/335, 357
See application file for complete search history.

(56) References Cited

U.S. PATENT DOCUMENTS 5,652,922 A * 7/1997 Kohno ...................... 396/72
5,661,609 A * 8/1997 Asakura et al. ............. 359/826
5,712,734 A * 1/1998 Kanno ....................... 359/701
5,926,656 A * 7/1999 Imura et al. ................. 396/55
6,392,826 B1 * 5/2002 Hayashi et al. ............. 359/823
6,469,840 B1 * 10/2002 Nomura et al. ............. 359/699
6,639,730 B1 * 10/2003 Muto et al. ................. 359/694
6,747,807 B1 * 6/2004 Iikawa et al. ............... 359/694
6,778,335 B1 * 8/2004 Takanashi ................... 359/704
6,809,884 B1 * 10/2004 Nomura et al. ............. 359/699
6,888,685 B1 * 5/2005 Nomura et al. ............. 359/701
6,909,464 B1 * 6/2005 Nomura et al. ............. 348/357

FOREIGN PATENT DOCUMENTS

JP          4-52628 A       2/1992

* cited by examiner

*Primary Examiner*—Loha Ben
(74) *Attorney, Agent, or Firm*—Frishauf, Holtz, Goodman & Chick, P.C.

(57) ABSTRACT

A zoom lens barrel comprises an exterior unit, which mainly forms an exterior portion, an optical unit having an image pickup optical system built therein, and a control unit and can be detachably mounted on a single-lens reflex camera. The optical unit includes first and second group lenses as the image pickup optical system, which can move forward and rearward in zooming and focusing, and a third group lens which can move forward and rearward in zooming. Particularly, in focusing, a first group lens holding frame for holding the first group lens and a second group lens holding frame for holding the second group lens are driven forward and rearward in a different amount in an optical axis direction through a cam follower and two cam grooves by driving a focus ring in rotation, thereby focusing is executed. The lens barrel can cope with a forward/rearward movement required in zooming and focusing and can be reduced in size.

20 Claims, 15 Drawing Sheets

F I G. 1 0
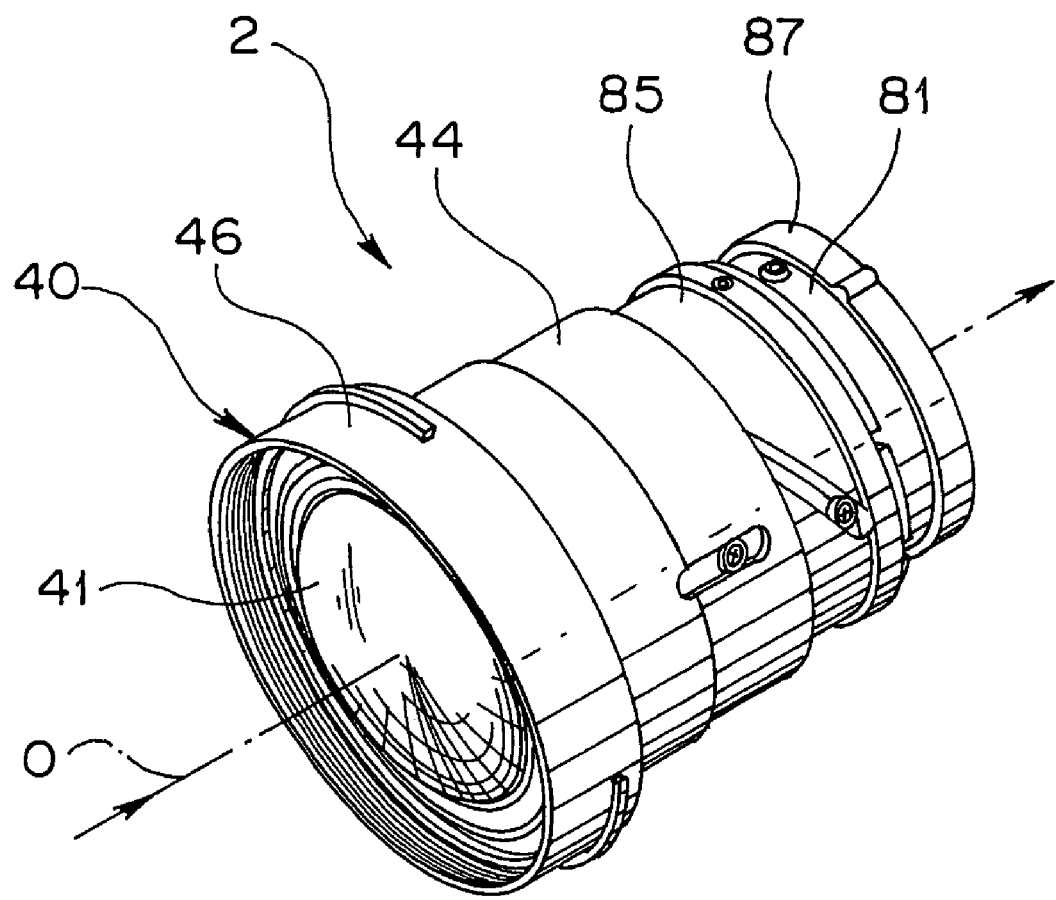

ZOOM LENS BARREL

This application claims benefit of Japanese Applications No. 2003-427953 filed in Japan on Dec. 24, 2003 and No. 2004-326873 filed in Japan on Nov. 10, 2004 the contents of which are incorporated by this reference.

BACKGROUND OF THE INVENTION

1. Field of the Invention

The present invention relates to a structure of a zoom lens barrel capable of executing focusing.

2. Related Art Stament

Image-pickup apparatuses such as a camera, an electronic camera, and the like have a lens barrel for holding an image pickup lens. In particular, when the image pickup lens is a lens capable of executing zooming, the lens barrel is called a zoom lens barrel.

An image pickup lens held by the zoom lens barrel is generally divided into a plurality of lens groups such as a lens group for mainly executing focusing, a lens group for mainly executing zooming, and the like depending on the optical functions born thereby. More specifically, there is an example in which a lens group (first group lens) disposed nearest to an object is called a focus lens group, a lens group (second group lens) disposed on the second nearest to the object side is called a zoom lens group. There is known a floating lens arranged to correct spherical aberration and the like by further dividing the focus lens group into a front group and a rear group and relatively moving the front group and the rear group according to an object distance.

As an example of a conventionally proposed zoom lens barrel having the above arrangement, there is exemplified a zoom lens barrel in which both a first group lens and a second group lens are moved in an optical axis direction and about an optical axis in both zooming and focusing.

A zoom lens barrel proposed in Japanese Unexamined Patent Application Publication No. 4-52628 relates to a lens barrel having a fixed frame and a movable lens holding frame and executing zooming or focusing by rotating the lens holding frame or moving it forward and rearward. In more detail, in the zoom lens barrel, a focal distance is changed by rotating or forward and rearward moving a first lens holding frame and a second lens holding frame and further a focusing operation is executed by moving the second lens holding frame forward and rearward, resulting in shortening the overall length of the lens barrel.

Further, in recent years, a great number of the zoom lens barrels described above are optically arranged to include an aspherical lens in addition to a spherical lens to obtain a higher optical performance.

Further, a lens hood is conventionally attached to the distal end of the zoom lens barrel. The lens hood prevents occurrence of flare and ghost by cutting light incident from the outside of an image pickup range. When the lens hood is a type attached to a lens barrel having a telescopic side focal distance, the lens hood often has such a structure that a conical surface is combined with a cylindrical surface. However, when the lens hood is a type attached to a lens barrel having a wide angle side focal distance, a lens hood cut in a complex shape is used so that an image to be picked up is not vignetted by it. In more detail, the lens hood having the complex shape is formed in a shape for cutting light outside of a rectangular image pickup range in a circular image circle formed by an image pickup lens. Accordingly, although the lens hood is formed symmetrically up and down and right and left, the lens hood is not suitably used when it is rotated in, for example, an oblique direction.

SUMMARY OF THE INVENTION

A zoom lens barrel of the present invention is characterized in that it can maintain desired optical characteristics, can move a plurality of lens groups in a different direction or in a different amount in focusing, and moreover can miniaturize its size.

One of zoom lens barrels of the present invention is characterized in a zoom lens barrel which comprises a first frame; a second frame rotating relatively to the first frame; a third frame moved in an optical axis direction by the rotation of the second frame; a fourth frame supported by the third frame and moved in the optical axis direction together with the third frame and capable of rotating relatively to the third frame; a fifth frame supported by the fourth frame and moved in the optical axis direction by the rotation of the fourth frame; a sixth frame supported by the fourth frame and moved in the optical axis direction by the rotation of the fourth frame; first straight movement means disposed to the first frame and to the fifth frame to prevent the fifth frame from rotating; second straight movement means to prevent the third frame from rotating; first drive means disposed to the fourth frame and to the fifth frame to drive the fifth frame with respect to the fourth frame; second drive means disposed to the fourth frame and to the sixth frame to drive the sixth frame in the optical axis direction in an amount different from an amount of the fifth frame; third straight movement means disposed to the fifth frame and to the sixth frame to prevent the sixth frame from rotating; and third drive means for rotating the fourth frame while being rotated about an optical axis and for driving the fifth frame and the sixth frame in the optical axis direction by driving the first drive means and the second drive means.

Another zoom lens barrel of the present invention is characterized in a zoom lens barrel which comprises a first lens group for constituting a zoom lens and also executing focusing; a second lens group for constituting a zoom lens and also executing focusing; first frame means for holding the first lens group and having first movement means for driving the first lens group in an optical axis direction for focusing; second frame means for holding the second lens group and having second movement means for moving the second lens group in the optical axis direction in an amount different from the first lens group for focusing; third frame means having third movement means for moving the first frame means and the second frame means together in the optical axis direction for executing zooming and having a peripheral groove disposed in a peripheral direction to move the first frame means and the second frame means in the optical axis direction by the third movement means; fourth frame means for supporting the first lens group and the second lens group, the fourth frame means having (a plurality of) portions with which the first movement means, the second movement means, and the peripheral groove are engaged, moving the first frame means and the second frame means in the optical axis direction in an different amount, respectively in focusing, and moving the first lens group and the second lens group together in the optical axis direction in zooming; zoom drive means for driving the third frame means to move the peripheral groove in the optical axis direction and to move the first frame means and the second frame means together in the optical axis direction for executing zooming; and focus drive means for driving the fourth frame means in rotation to move the first frame means and the second frame means in the optical axis direction in a relatively different amount for focusing.

Other features and advantages of the present invention will be apparent from the following explanation.

BRIEF DESCRIPTION OF THE DRAWINGS

FIG. 10 is a perspective view of the optical unit of FIGS. 5 and 6 in an assembled state.

DETAILED DESCRIPTION OF THE PREFERRED EMBODIMENTS

Embodiments of the present invention will be explained below using the drawings.

A lens barrel as a first embodiment of the present invention will be explained using FIGS. 1 to 13.

Figure 1:
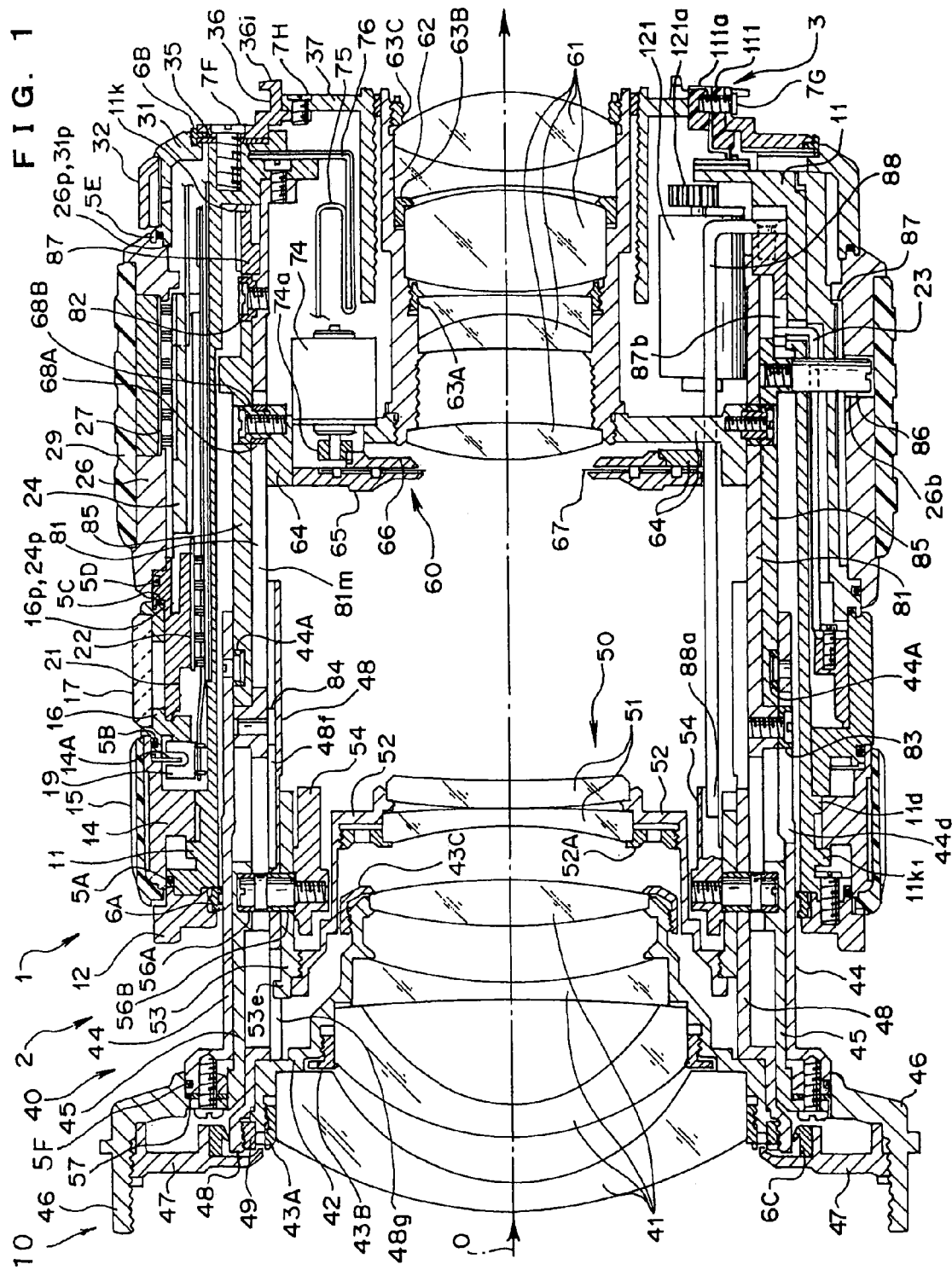
FIG. 1 is a sectional view of a lens barrel as a first embodiment of the present invention on an optical axis in a wide state.
Figure 2:
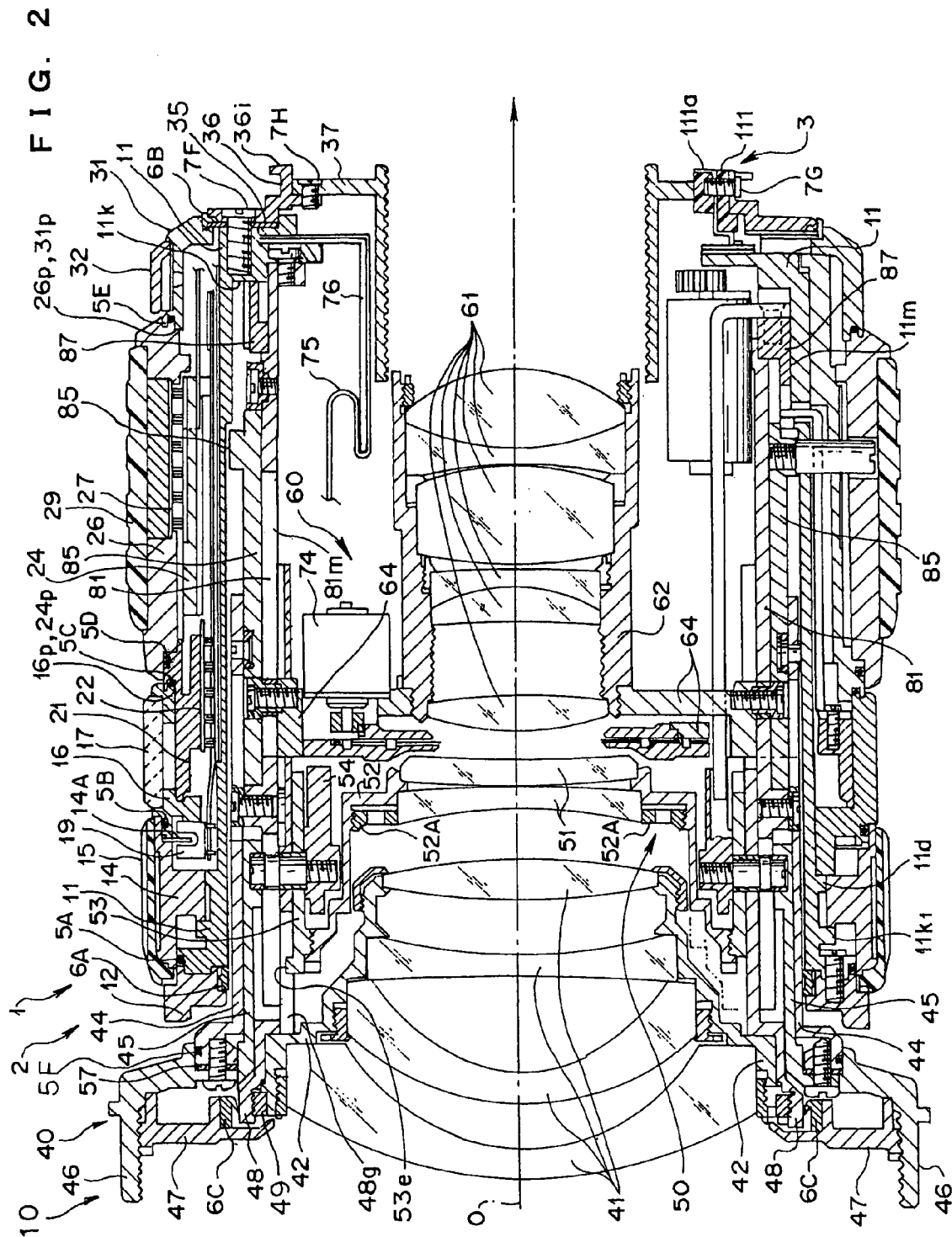
FIG. 2 is a sectional view of the lens barrel of FIG. 1 on the optical axis in a telescopic state.
Figure 3:
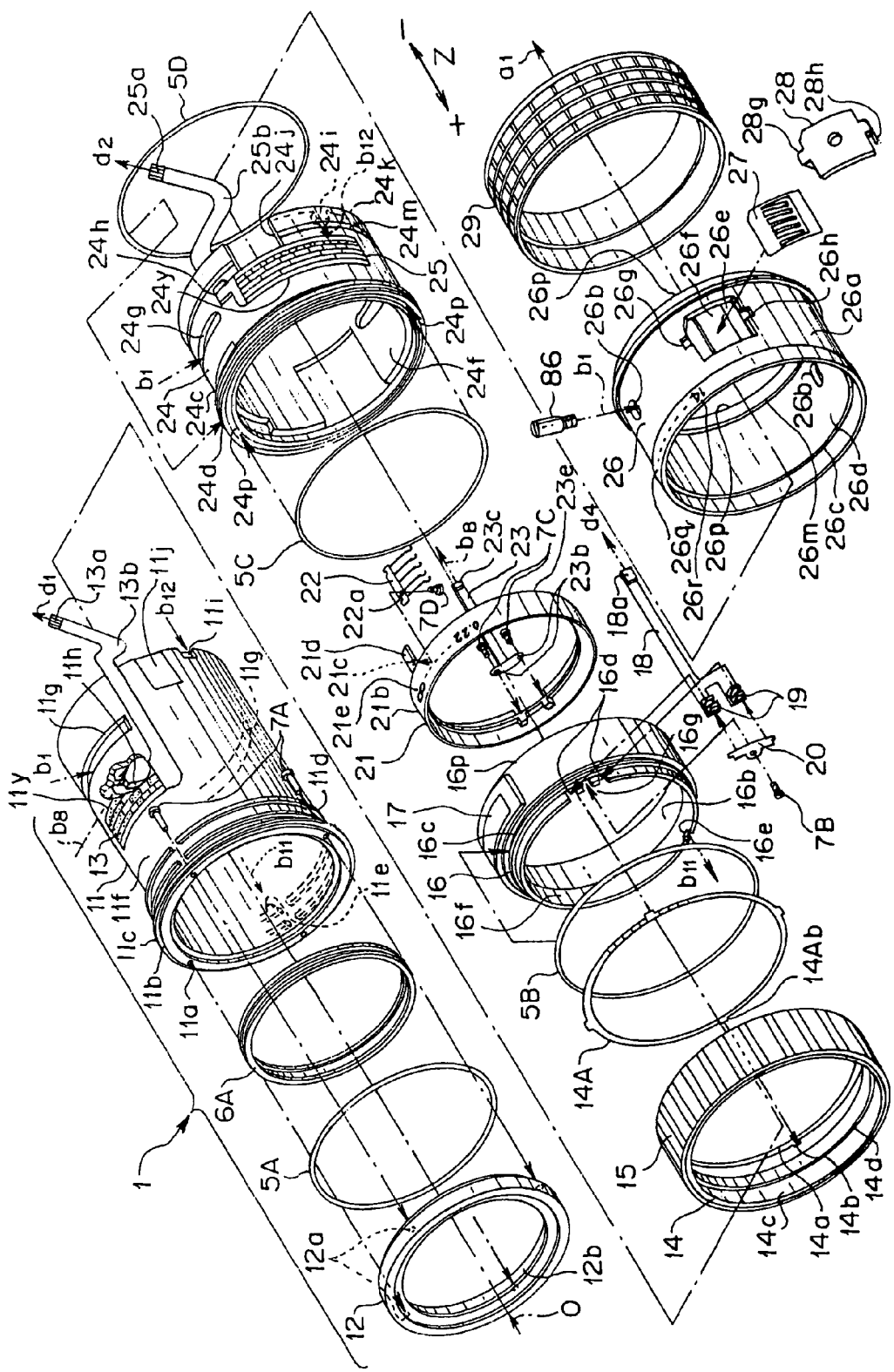
FIG. 3 is an exploded perspective view of a part of an exterior unit constituting the lens barrel of FIG. 1.
Figure 4:
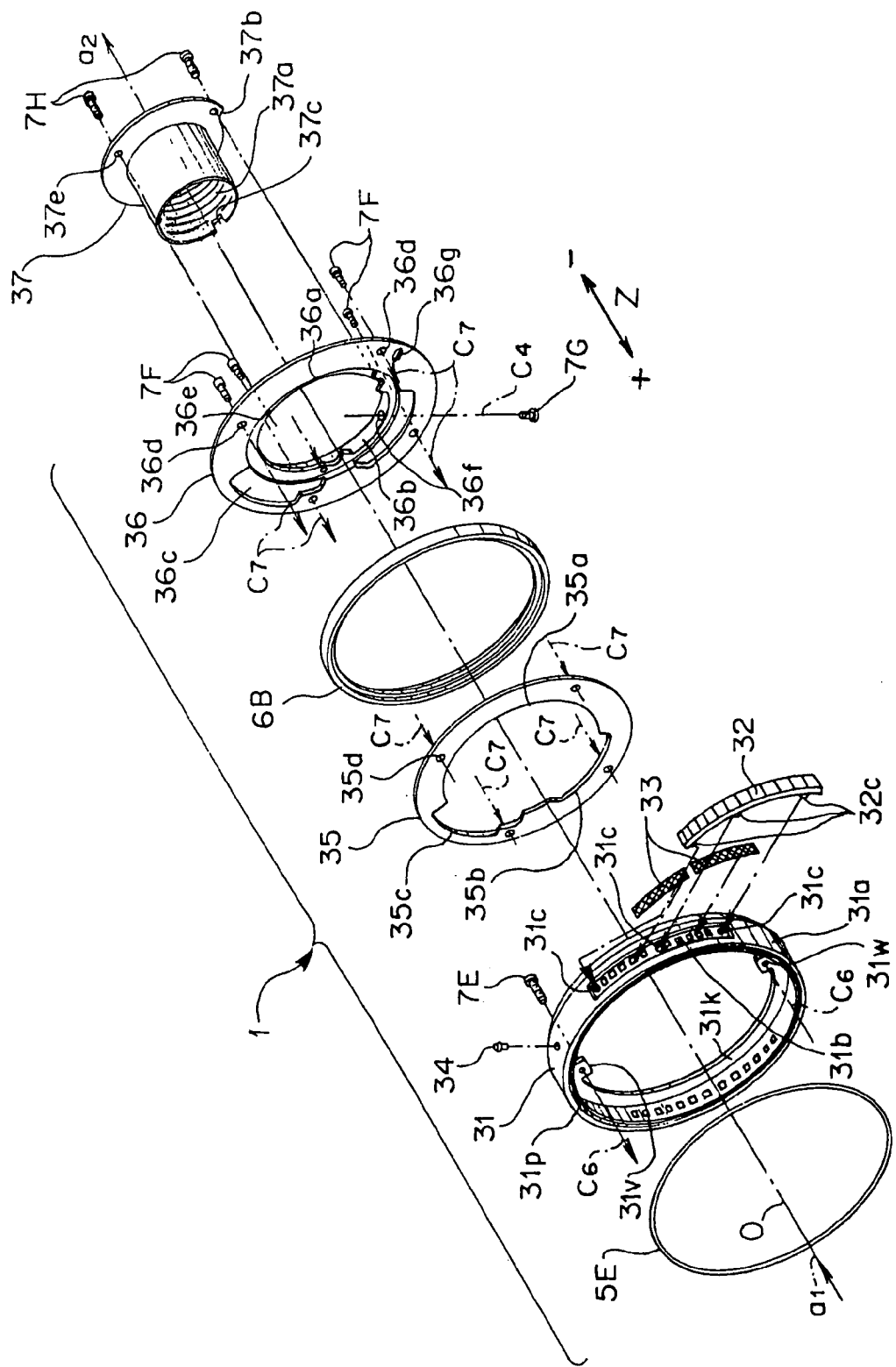
FIG. 4 is an exploded perspective view of another part of the exterior unit constituting the lens barrel of FIG. 1.
Figure 5:
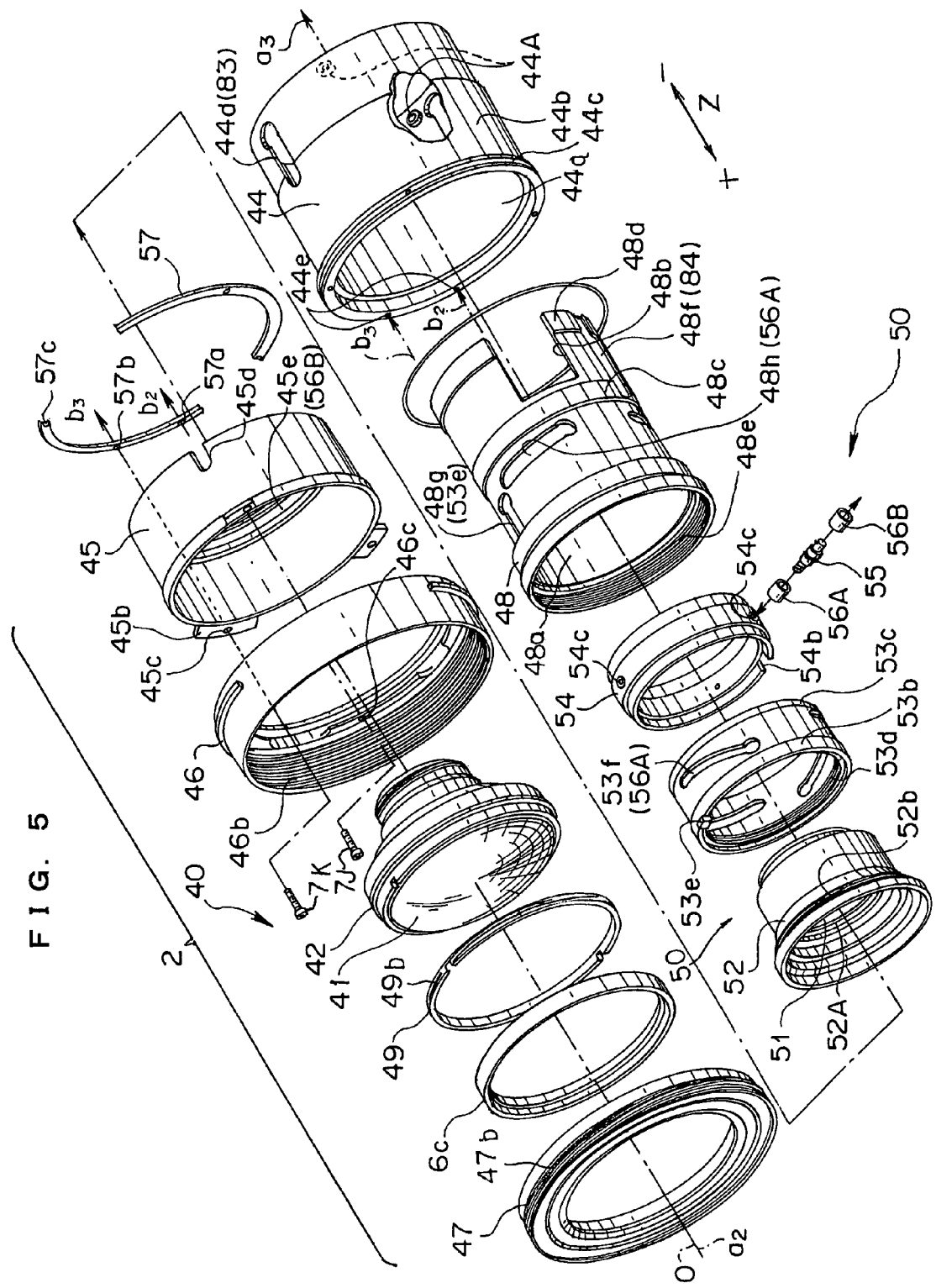
FIG. 5 is an exploded perspective view of a part of an optical unit constituting the lens barrel of FIG. 1.
Figure 6:
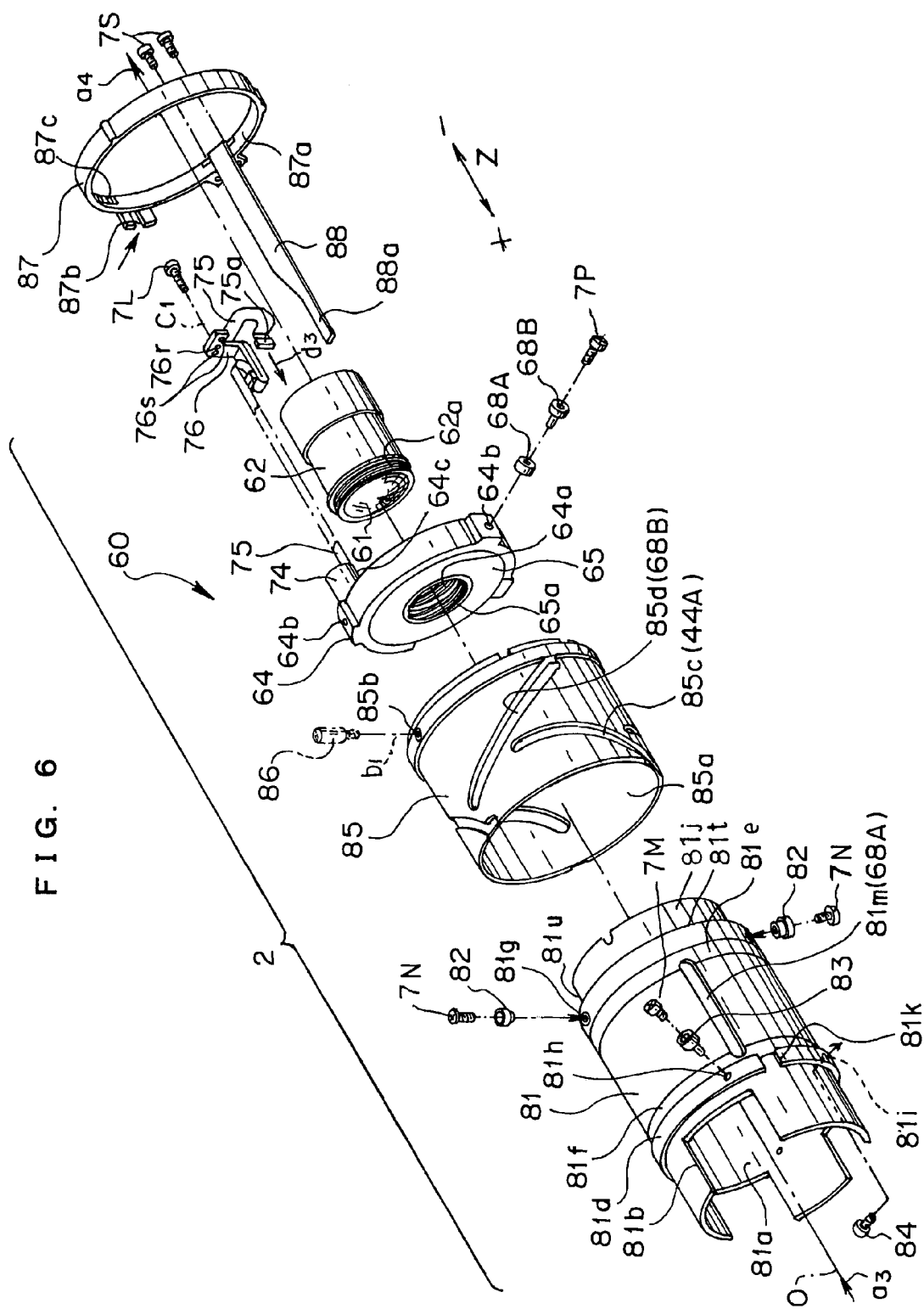
FIG. 6 is an exploded perspective view of another part of the optical unit constituting the lens barrel of FIG. 1.
Figure 7:
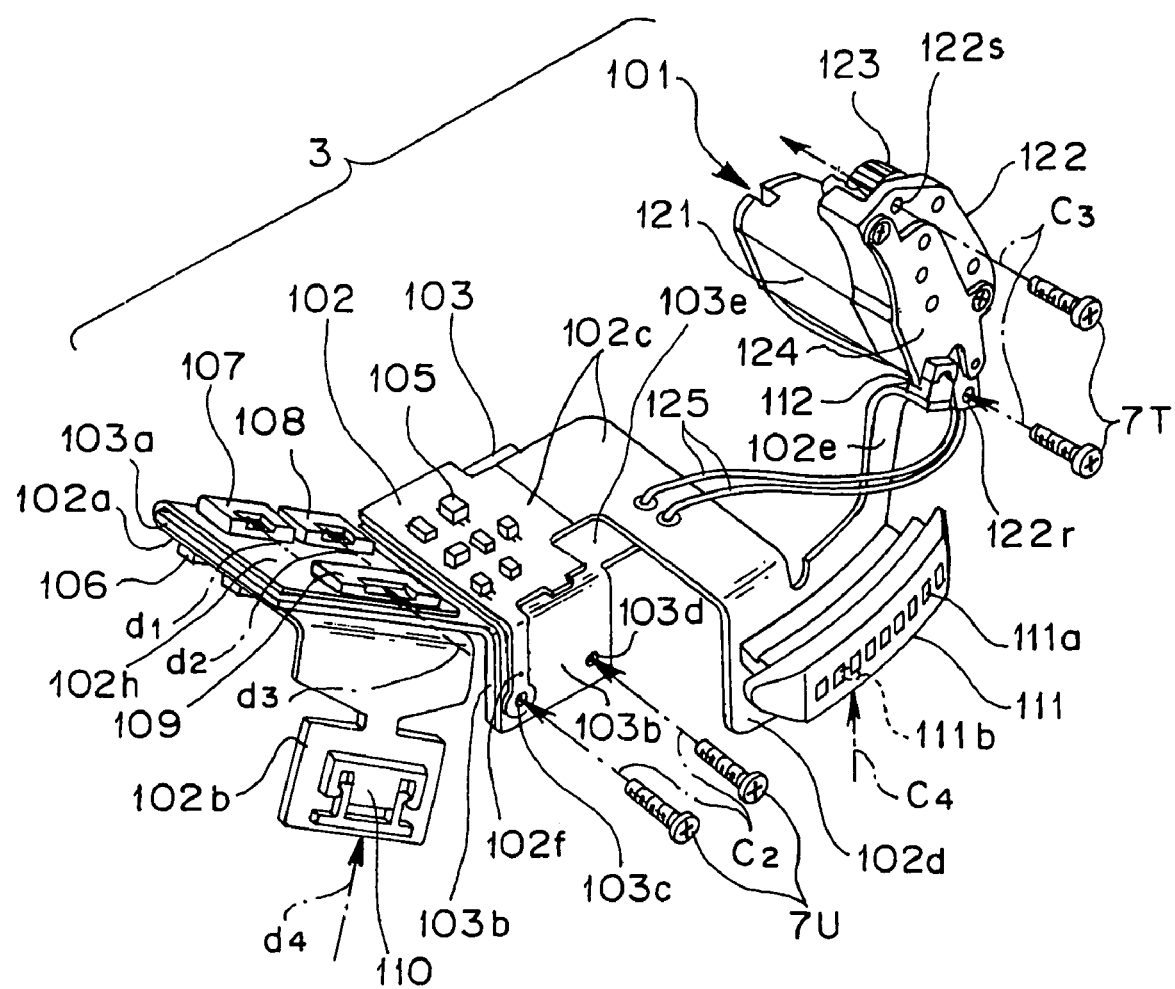
FIG. 7 is a perspective view of a control unit constituting the lens barrel of FIG. 1 when it is viewed from an image forming side (rear side).
Figure 8:
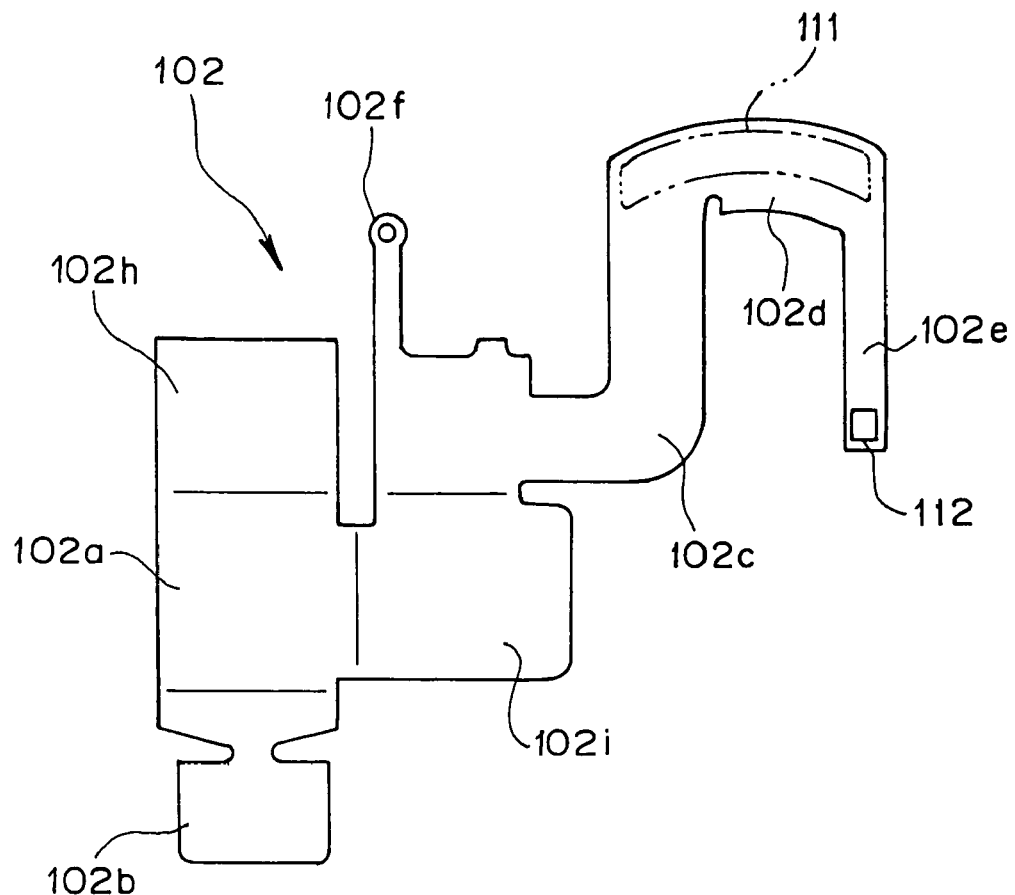
FIG. 8 is a developed view of a lens barrel control FPC constituting the control unit of FIG. 7.
Figure 9:
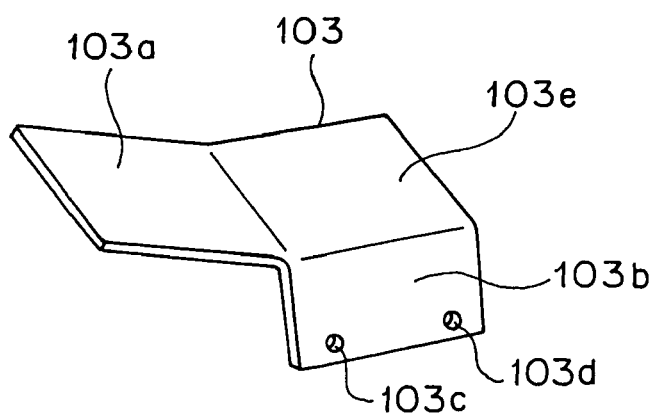
FIG. 9 is a perspective view of an FPC support plate constituting the control unit of FIG. 7.
Figure 11:
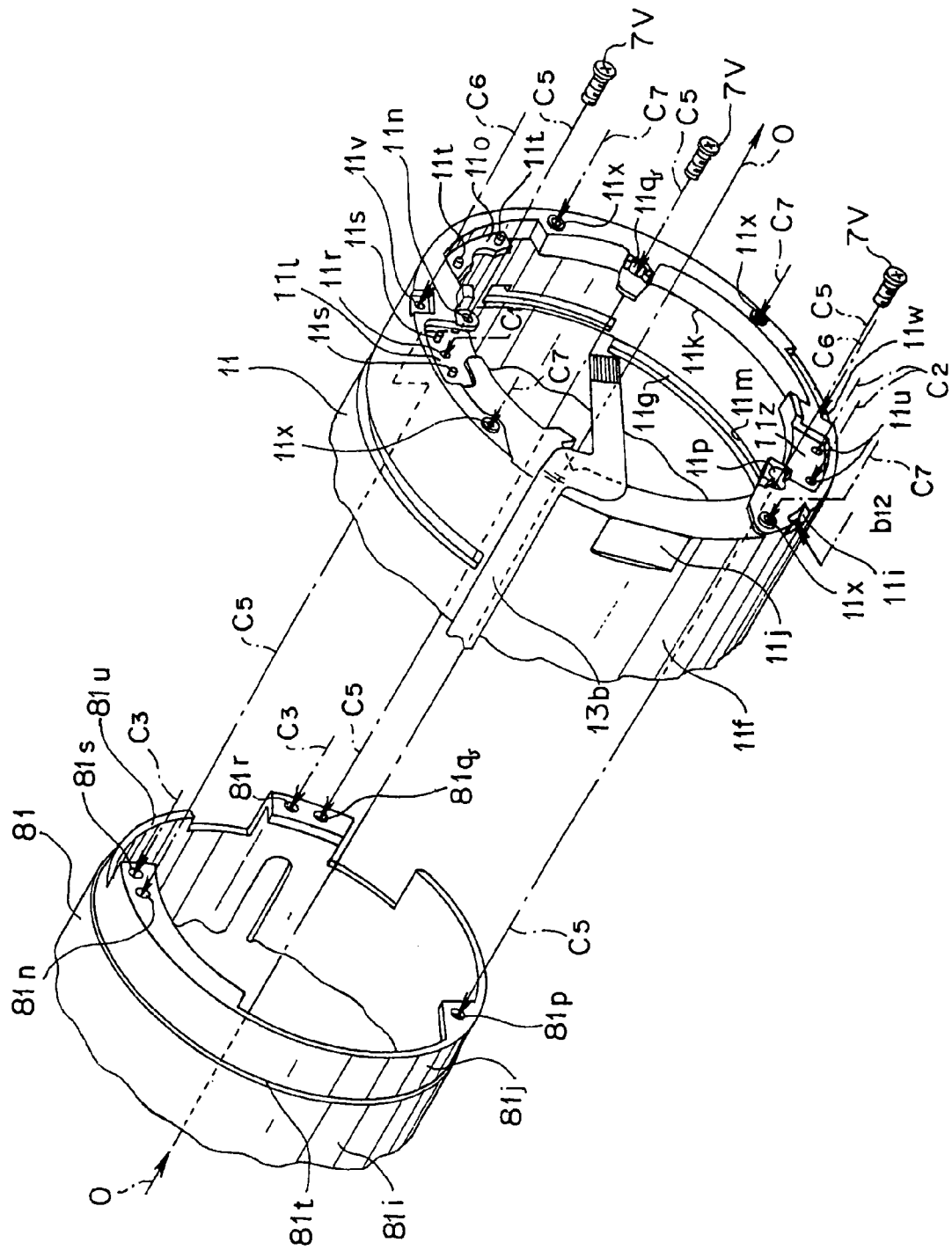
FIG. 11 is an exploded perspective view of a main frame and a fixed ring to be fixed to each other in the lens barrel of FIG. 1 when they are viewed from the image forming side (rear side).
Figure 12:
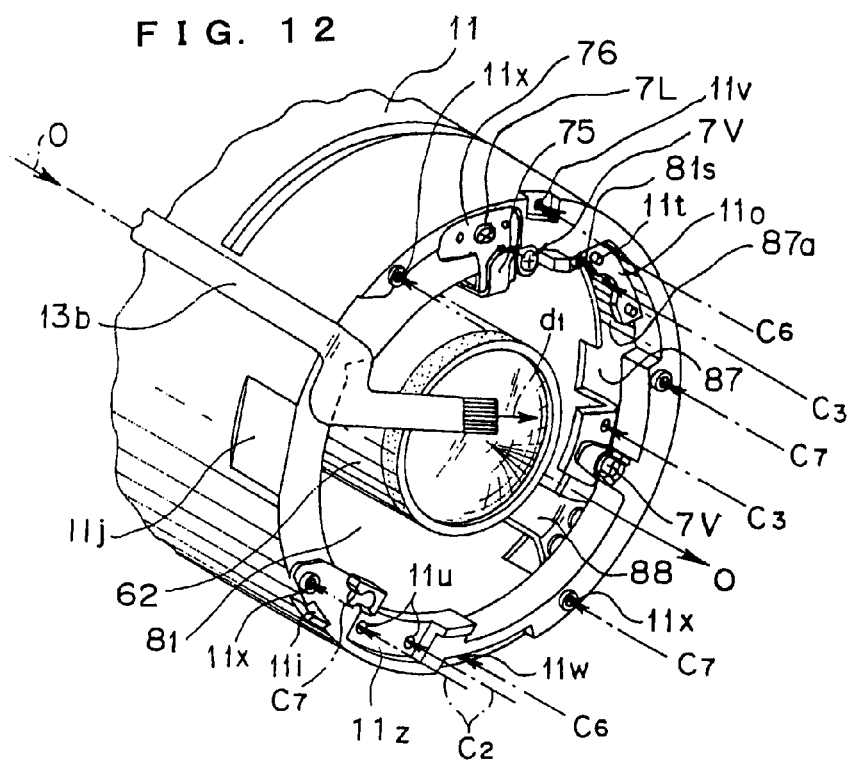
FIG. 12 is a perspective view of an assembled body comprising the exterior unit of FIGS. 3 and 4 and the optical unit of FIG. 10 when the rear portion of the assembled body is viewed from the image forming side (rear side).
Figure 13:
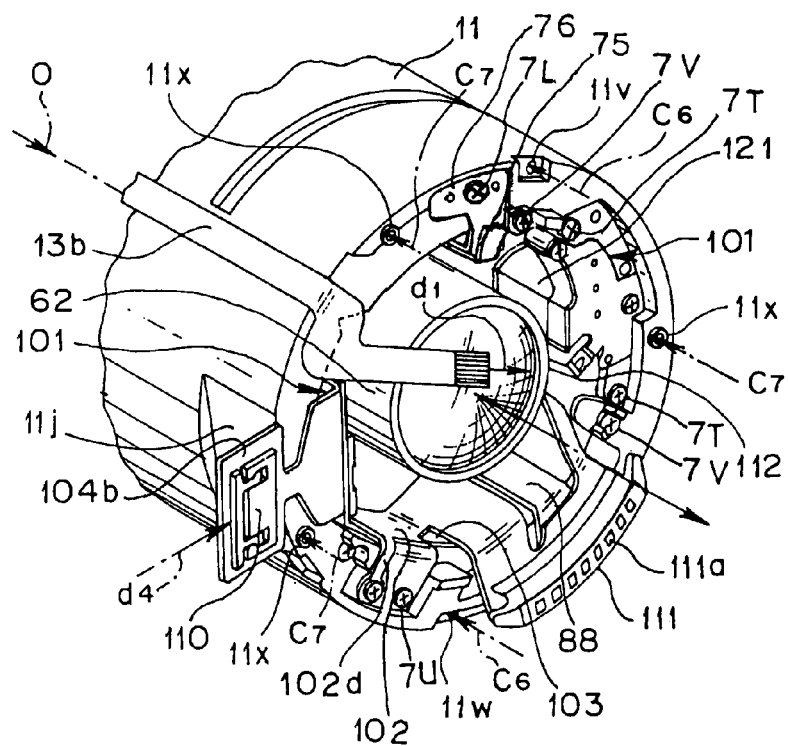
FIG. 13 is a perspective view of a state in which the control unit is attached to the rear portion of the assembled body of the optical unit and the exterior unit shown in FIG. 12 when the assembled body is viewed from the image forming side (rear side).

FIG. 1 is a sectional view of the lens barrel on an optical axis when it is in a wide state as well as in an infinite focusing state. FIG. 2 is a sectional view of the lens barrel on the optical axis when it is in a telescopic state and in the infinite focusing state. FIG. 3 is an exploded perspective view of a part of an exterior unit constituting the lens barrel, and FIG. 4 is an exploded perspective view of another part of the exterior unit constituting the lens barrel. FIG. 5 is an exploded perspective view of a part of an optical unit constituting the lens barrel, and FIG. 6 is an exploded perspective view of another part of the optical unit constituting the lens barrel. FIG. 7 is a perspective view of a control unit constituting the lens barrel when it is viewed from an image forming side (rear side). FIG. 8 is a developed view of a lens barrel control FPC constituting the control unit. FIG. 9 is a perspective view of an FPC support plate constituting the control unit. FIG. 10 is a perspective view of an assembled state of the optical unit constituting the lens barrel. FIG. 11 is an exploded perspective view of the rear end of a main frame of the exterior unit and the rear end of a fixed ring of the optical unit when they are viewed from the image forming side (rear side). FIG. 12 is a perspective view of an assembled body of the optical unit and the exterior unit when they are viewed from the image forming side (rear side). FIG. 13 is a perspective view showing a state in which a control unit is further attached to the assembled body of the optical unit and the exterior unit when the state is viewed from the image forming side (rear side).

Note that, in the following explanation, the optical axis of an optical system (image pickup lens) of the lens barrel is shown by O, and a direction along the optical axis O is defined as a Z-direction. The object side of the lens barrel in the Z-direction is defined as a front direction (+Z-direction) and the image forming side thereof is defined as a rear direction (−Z-direction). Further, the rotating direction of respective components is shown as clockwise or counter-clockwise when viewed from an object side. In FIGS. 3 to 13, the directions shown by the same reference numerals such as a1-an, b1-bn, c1-cn, d1-dn, and the like show directions in which pertinent components are inserted, engaged, or screwed when they are assembled.

The lens barrel 10 is a zoom lens barrel which can be detachably mounted on a single lens reflex type camera body as well as can adjust a focus. The lens barrel 10 mainly comprises an exterior unit 1 for forming an exterior of the lens barrel, an optical unit 2 accommodated in the exterior unit 1 and having an optical system of the lens barrel built therein, and a control unit 3 for controlling the drive of the lens barrel 10. The optical system of the lens barrel 10 comprises, from an object side (front side), a first group lens 41 and a second group lens 51, which are moved forward and rearward in zooming and focusing, a third group lens 61 moved forward and rearward in zooming, and aperture blades 67.

As shown in FIGS. 1–4, the exterior unit 1 comprises a main frame 11 as a fixed frame having a front cover 12 attached to a front surface and including the optical unit 2 therein; a distance ring 14, which is a member having a rubber ring 15 attached around an outer periphery and rotated when a focus is adjusted, the distance ring 14 being rotatably engaged with the main frame 11; an inside frame 16 as a display ring hold ring, which is fixed to and supported by the outer periphery of the main frame 11 and rotatably supports a scale ring 21; the scale ring 21 as a distance scale display ring, which is rotatably held between the outer periphery of the main frame 11 and the inner periphery of the inside frame 16 and displays the focused position of an object on a field side corresponding to the focusing position of a focus lens system; a zoom table 24 fixed to and supported by the outer periphery of the main frame 11; a zoom ring 26, which has a rubber ring 29 engaged with and attached to an outer periphery and rotated in zooming; a rear cover (rear end cover) 31 acting as a rear end exterior member, which is fixed to and supported by the outer periphery of the main frame 11 on the back side thereof and disposed to an rear end to prevent the movement of the distance ring 14, the inside frame 16, the zoom ring 26, and the like in an optical axis O direction; a lens mount 36 fixed to the back surface of the main frame 11; and a cover rear frame 37 inserted into and fixed to the inner periphery of the lens mount 36.

As shown in FIGS. 1, 2, 5, and 6, the optical unit 2 comprises a first group frame unit 40 having the first group lens 41 as a first lens group built therein; a second group frame unit 50 having the second group lens 51 as a second lens group built therein; a focus ring 54 as a fourth frame (focus lens drive frame) for moving the first and second group frame units 40 and 50 forward and rearward in focusing; a third group frame unit 60 having the third group lens 61 and the aperture blades 67 built therein; a fixed ring 81 as a first frame (as well as an optical unit side fixed frame) fixed to and supported by the main frame 11; a cam ring 85 as a second frame (as well as zoom drive means) rotatably supported by the fixed ring 81; and a focus drive ring 87 rotatably supported by the rear portion of the fixed ring 81 to drive the focus ring 54 in rotation.

As shown in FIG. 7, the control unit 3 comprises a focus lens drive unit 101 having a focus motor, a motor PI (photo interrupter), a speed reduction gear train, and the like; and a lens barrel control FPC (lens barrel control board) 102 comprising a flexible board on which respective control FPC (flexible board) connectors, a control IC, mount contacts, and the like are mounted.

Note that, in the lens barrel 10, the first group lens 41, the second group lens 51, the third group lens 61, and the aperture blades 67 are driven forward and rearward along the optical axis O direction by rotating the zoom ring 26. Further, the first group lens 41 and the second group lens 51 are driven forward and rearward in the optical axis O direction by rotating the focus drive ring 87.

Next, the more details of the respective components of the lens barrel 10 described above, a procedure for assembling the components, and the like will be explained below.

Note that in the lens barrel 10, after the optical unit 2 is assembled first as a unit and assembled to the main frame 11 of the exterior unit 1, the respective components of the exterior unit are sequentially fitted on and assembled to the outer periphery of the main frame 11. Thereafter, the control unit 3 is assembled to the main frame 11 from the rear side thereof, and a lens mount is attached, thereby the assembly of the lens barrel 10 is completed. However, a sequence for assembling them is not always limited to the sequence described below.

First, the respective components of the optical unit 2 will be explained. As described above, the optical unit 2 comprises the first group frame unit 40, the second group frame unit 50, the focus ring 54, the third group frame unit 60, the fixed ring 81, the cam ring 85, and the focus drive ring 87.

As shown in FIG. 5, the first group frame unit 40 includes a first group lens holding frame 42 for holding the first group lens 41 and a first group frame 48 as a fifth frame (as well as first frame means) and further includes an adjustment frame 45 and a first group moving frame 44 as a third frame, a filter ring 46, a decoration ring 47, a presser ring 49, and two interval seat plates 57.

As shown in FIG. 5, the second group frame unit 50 includes a second group lens holding frame 52 for holding the second group lens 51 and a second group cam frame 53 as a sixth frame (as well as second frame means).

The first group lens holding frame 42 is a circular-ring-shaped frame member having an opening, and the first group lens 41 comprising a plurality of lenses is fixed to the opening. A rear lens of the first group lens 41 is held by being pressed by a lens presser 43C, an intermediate lens thereof is held by being pressed a lens presser 43B, and a front lens thereof is held by being pressed by a lens presser 43A, respectively.

The first group frame 48 is a cylindrical frame member and is provided with an inner peripheral screw portion (female screw) 48e, which is disposed to a front end inner periphery and in which the presser ring 49 can be screwed; a straight moving groove (pass-through groove passing through inner and outer peripheries) 48g as third straight movement means disposed to a front cylindrical portion; three cam grooves (pass-through grooves) 48h (as well as first movement means, first focus cam means); three escaping cutout portions 48b disposed on a rear side; and a bottomed straight moving groove 48f as first straight movement means disposed to a cylindrical outer periphery along an optical axis O. The cam grooves 48h are cam grooves slightly inclining to a +Z side in a counterclockwise direction with respect to the peripheral direction of a cylindrical portion.

The presser ring 49 is a circular-ring-shaped frame member and is provided with an outer peripheral screw portion (male screw) 49b on an outer periphery.

The second group lens holding frame 52 is a circular-ring-shaped frame member having an opening, and the second group lens 51 comprising a plurality of lenses is fixed to the opening. The second group lens 51 is held by being bonded and pressed by a lens presser 52A. The second group lens holding frame 52 is provided with an outer peripheral screw portion (male screw) 52b disposed to a front outer periphery.

The second group cam frame 53 is a circular-ring-shaped frame member and is provided with a straight moving guide projection 53e as third straight movement means disposed on a front end and projecting to an outer periphery, and an inner peripheral screw portion (female screw) 53d in which the outer peripheral screw portion 52b of the second group lens holding frame 52 is screwed. Further, the second group cam frame 53 is provided with three cam grooves (pass-through grooves) 53f as second drive means (as well as second movement means, second focusing cam means) disposed to a cylindrical portion. The cam grooves 53f are cam grooves slightly inclining to a −Z side in the counterclockwise direction with respect to the peripheral direction of the cylindrical portion.

The focus ring 54 is a circular-ring-shaped frame member including a partly bottomed straight moving groove 54b, which is disposed on an outer periphery and extends in the optical axis O direction and in which the distal end inserting portion 88a of a coupling arm 88 to be described later is inserted; and three cam follower attaching screw holes 54c formed on the outer periphery. Three stepped pins 55 each having first and second drive means are screwed in the screw holes 54c. The stepped pins 55 are screwed in the screw holes 54c in the state that cam followers 56A acting as engaging portions on the optical axis O side are rotatably fitted on the stepped pins 55 and cam followers 56B acting as engaging portions on the outside are rotatably fitted thereon. The cam followers 56A are slidably inserted into the cam grooves 48h of the first group frame 48 and into the cam grooves 53f of the second group cam frame 53. The cam followers 56B are slidably inserted into peripheral grooves 45e of the adjustment frame 45. The peripheral grooves 45e are bottomed grooves, and the cam followers 56B are inserted into the peripheral grooves 45e in the state that the extraction thereof is prevented in an assembled state.

The first group moving frame 44 is a cylindrical frame member and is provided with an O-ring groove 44c formed around the outer periphery of a front collar portion; six screw holes 44e formed around a front end surface; and two straight moving grooves (pass-through holes) 44d as second straight movement means formed on a rear periphery along the optical axis O direction. Further, the first group moving frame 44 includes three cam followers 44A rotatably supported around a rear inner periphery.

The adjustment frame 45 is a cylindrical frame member and includes three mounting projections 45b, which project from the outer periphery of an front end surface and have screw insertion holes 45c; and further a bottomed peripheral groove 45e formed along an peripheral direction around a rear inner periphery; and three cutouts 45d formed to a rear end in parallel with the optical axis O so as to be in contact with the peripheral groove 45e.

The filter ring 46 is a circular-ring-shaped frame member and includes an inner peripheral screw portion (female screw) 46b, which is disposed to a front inner periphery and in which the decoration ring 47 is screwed; and a screw insertion hole 46c formed through an attachment portion projecting in a rear inner periphery.

The decoration ring 47 is a circular-ring-shaped frame member and includes an outer peripheral screw portion (male screw) 47b formed around an outer periphery.

The interval seat plates 57 are seat plates formed along an arc, and each of which includes screw insertion holes 57a and 57b and a screw insertion cutout 57c. The interval seat plates 57 are seat plates for adjusting the interval in the optical axis O direction between the first group moving frame 44 and the adjustment frame 45, and seat plates having various thicknesses are selectively used.

When first and second group assembled mechanical portions, which include the first group frame unit 40, the second group frame unit 50, the first group moving frame 44, the filter ring 46, and the like comprising the members described above, are assembled, first, the second group lens holding frame 52 is inserted into the inner periphery of the second group cam frame 53, and the second group cam frame 53 is fixed to the second group lens holding frame 52 by screwing the screw portion 52b in the screw portion 53d. Further, the focus ring 54 is inserted into the inner periphery of the second group cam frame 53, rotated, and slidably engaged therewith, and then inserted into the inner periphery 48a of the first group frame 48 from the front side thereof, rotated, and slidably engaged therewith. When they are engaged with each other, the straight moving guide projection 53e of the second group cam frame 53 is slidably inserted into the straight moving groove 48g of the first group frame 48. Accordingly, the first group frame 48 and the second group lens holding frame 52 are supported in the state that they can be relatively moved in the optical axis O direction in the state that the rotation thereof is prevented with respect to each other.

The adjustment frame 45 is fitted on the outer periphery of the first group frame 48 from the rear side thereof and engaged with the front outer periphery of the first group frame 48. In the engaged state of them, the stepped pins 55, on which the cam followers 56A are fitted, are inserted into the adjustment frame 45 from the cutouts 45d thereof, caused to pass through the cam grooves 48h of the first group frame 48 and further the cam grooves 53f of the second group cam frame 53, and screwed in and fixed to the screw holes 54c of the focus ring 54. Further, the cam followers 56B are inserted into the adjustment frame 45 from the cutouts 45d thereof and fitted on the distal ends of the stepped pins 55. When the focus ring 54 is rotated in this state, the cam followers 56B are rotatably and slidably engaged with the peripheral grooves 45e of the adjustment frame 45. Note that the screw holes 54c of the focus ring 54 and the cutouts 45d are located such that the phases thereof are lightly displaced from each other. Accordingly, when the three stepped pins 55 are inserted, they are inserted and screwed one by one while aligning the cutouts 45d with the screw holes 54c by rotating the adjustment frame 45 by the amount of displacement of the phases. With the above operation, the cam followers 56B can be prevented from being removed from the stepped pins 55 in an assembly job.

Further, the first group lens holding frame 42 is inserted into the inner periphery of the first group frame 48 from the front side thereof, and the first group lens holding frame 42 is fixed to the first group frame 48 by screwing the presser ring 49 in the screw portion 48e of the first group frame 48.

The inner periphery 44a of the first group moving frame 44 is fitted on the outer periphery of the adjustment frame 45 in the assembled state as described above from the rear side thereof. At the time, the two interval seat plates 57 each having a proper thickness is sandwiched between the front surface of the first group moving frame 44 and the rear surface of the attachment projection 45b of the adjustment frame 45. Screws 7K are inserted into the screw insertion holes 45c and 57b and screwed in the screw holes 44e of the first group moving frame 44, thereby the first group moving frame 44 is fixed to the adjustment frame 45. As described above, the interval in the optical axis direction between the first group moving frame 44 and the adjustment frame 45 can be adjusted to a predetermined spaced distance by sandwiching the two interval seat plates 57 having the proper thickness therebetween. In more detail, the spaced distance between the cam followers 44A of the first group moving frame 44 and the focus ring 54 supported through the adjustment frame 45, in other words, the spaced distance in the respective forward and rearward moving states of the first group lens 41 and the second group lens 51 with respect to the cam followers 44A can be kept to a predetermined allowable accuracy.

Further, the inner periphery of the filter ring 46 is engaged with the front surface of the first group moving frame 44 having an O-ring 5F fitted in the O-ring groove 44c around the outer periphery thereof, further filter ring attachment portions are abutted across the interval seat plates 57, screws 7J are inserted into the screw insertion hole 46c and 57a, the screw insertion cutout 57c, and the like and screwed in the screw holes 44e of the first group moving frame 44, thereby the filter ring 46 is fixed to the front surface of the first group moving frame 44. Further, the screw portion 46b of the filter ring 46 is screwed on the screw portion 47b in the state that a water proof ring 6C is interposed between the front end outer periphery of the first group frame 48 and the inner periphery of the decoration ring 47, thereby the decoration ring 47 is fixed to the filter ring 46. In the assembled state, the first group frame 48, to which the first group lens holding frame 42 is fixed, is supported in the decoration ring 47 so as to relatively move forward and rearward in the optical axis O direction in a minute amount with respect to the first group moving frame 44 and the adjustment frame 45. Further, the second group lens holding frame 52 and the second group cam frame 53 are supported so as to relatively move forward and rearward in the optical axis direction with respect to the first group frame 48. The relative position in the optical axis direction of the focus ring 54 is held at a predetermined position with respect to the adjustment frame 45 by the peripheral grooves 45e of the adjustment frame 45 and the cam followers 56B. That is, the focus ring 54 and the adjustment frame 45 can be moved together only in the optical axis O direction.

The assembly of the first and second group assembled mechanical portions, which comprise the second group frame unit 50, the first group frame unit 40, the first group moving frame 44, the filter ring 46, and the like, is completed by the assembly described above. In this assembled state, when the focus ring 54 is not rotated (in a zooming operation), the first group lens holding frame 42, the first group frame 48, and the second group frame unit 50, which comprises the second group lens holding frame 52 and the second group cam frame 53, are held so as to move forward and rearward together with the first group moving frame 44. In contrast, when the focus ring 54 is rotated about the optical axis O (in a focusing operation), the first group lens holding frame 42 and the second group lens holding frame 52 are relatively driven forward and rearward along the optical axis O direction in a different direction by the rotation of the focus ring 54 with respect to the first group movement frame 44 and the adjustment frame 45 through the cam follower 56A and the cam grooves 48h and 53f. Specifically, when the focus ring 54 is driven in rotation counterclockwise (from the infinite position toward the nearest position in focusing) in a focusing drive, the first group lens holding frame 42 is slightly moved in a −z direction, and the second group lens holding frame 52 is moved in a +z direction while being straight guided with respect to the first group frame 48.

The fixed ring 81 is a cylindrical member and fixed to and supported by the inner rear end of the main frame 11 on the exterior unit 1 side as shown in FIGS. 6 and 11. Escaping cutouts 81b are disposed at three positions on the front side of the fixed ring 81, a front periphery-shaped stepped portion 81d is disposed around the fixed ring 81. The front periphery-shaped stepped portion 81d has two screw holes 81h, two cam follower pin fixing holes 81i and three insertion grooves 81k in the optical axis O direction. Further, three straight moving grooves (pass-through grooves) 81m are formed along the optical axis at the center of a cylindrical portion, and three screw holes 81g are formed in a rear portion of the cylindrical portion. A periphery-shaped stepped portion 81t is disposed around the rear end of the rear cylindrical portion 81j of the fixed ring 81. Further, as shown in FIG. 11, screw holes 81n, 81p, 81q, 81r, and 81s, cutouts 81u, and the like are disposed on the rear end surface of the inner flange of the fixed ring 81.

The first group frame 48 of the first group frame unit 40 is inserted into the front side of the inner periphery 81a of the fixed ring 81 and an aperture frame 64 of the third group frame unit 60 are inserted into the rear side thereof so as to move forward and rearward, respectively. Further, the cam ring 85 is rotatably fitted on outer peripheries 81e and 81f. The cam ring 85 is held while its movement in the optical axis O direction being prevented by the periphery-shaped stepped portion 81d and stopper members 82 to be described later. A focus drive ring 87 is rotatably fitted on the rear end outer periphery 81j. The focus drive ring 87 is held while its movement in the optical axis O direction being prevented by the periphery-shaped stepped portion 81t and a rear inner peripheral end surface 11k of the of the main frame 11 of the exterior unit 1.

Screws 7M, on which cam followers 83 are fitted, are screwed in the two screw holes 81h of the fixing ring 81, and the two cam followers 83 as second straight movement means are fixed to the fixing ring 81. The cam followers 83 are slidably inserted into the straight moving grooves 44d of the first group movement frame 44. The pins of cam followers 84 as first straight movement means are inserted into the cam follower pin fixing holes 81i from the inner peripheries thereof, caulked, and fixed. The cam followers 84 are slidably engaged with the straight moving groove 48f of the first group frame 48. Screws 7N, on which three stopper members 82 are fitted, are screwed in the three screw holes 81g, thereby the three stopper members 82 are fixed. The movement of the cam ring 85 in the optical axis O direction is prevented by the stopper members 82.

The cam ring 85 is a cylindrical member and is rotatably fitted on the outer peripheries 81f and 81e of the fixed ring 81 and held thereby, and the first group moving frame 44 is fitted on the outer periphery of the cam ring 85 so as to relatively move forward and rearward and rotate as shown in FIG. 6. The cam ring 85 has a front insertion port on the outer peripheral front side of a cylindrical portion and is provided with three bottomed cam grooves 85c, third cam means, obliquely inclining with respect to the optical axis O direction, two cam grooves (pass-though grooves) 85d obliquely inclining with respect to the optical axis O direction on the rear side of the cylindrical portion, and screw holes 85b formed to a periphery-shaped stepped portion along a rear outer periphery.

The focus drive ring 87 is a ring-shaped member and is provided with an engaging fork portion 87b projecting forward and an internal gear portion 87c disposed to a part of an inner periphery 87a as shown in FIG. 6. Further, the accurately straight coupling arm 88 as third drive means (as well as focusing drive means), which comprises a key member extending forward along the optical axis O through an inner periphery, is fixed to and supported by the focus drive ring 87. The coupling arm 88 is a metal plate member and fixed to the rear end surface of the focus drive ring 87 by screws 7S. The distal end inserting portion 88a whose width is formed smaller than the root portion thereof is disposed to the front distal end of the coupling arm 88. Note that the distal end inserting portion 88a is inserted into the straight moving groove 54b of the focus ring 54 so as to slide in the optical axis O direction. The distal end 23c of a coupling arm 23 of the scale ring 21 on the exterior unit 1 side is inserted into the engaging fork portion 87b. Further, an output gear 123 of the reduction gear train of the focus lens drive unit 101, which will be described later, is meshed with the internal gear portion 87c.

The third group frame unit 60 comprises an aperture frame unit portion and a third group frame portion.

As shown in FIGS. 1, 2, and 6, the aperture frame unit portion includes the aperture frame 64, an aperture front plate 65, an aperture drive plate 66, the plurality of aperture blades 67, an aperture drive motor 74 as a stepping motor, an aperture release reset position detecting aperture PI (not shown), an aperture FPC 75 connected to the aperture drive motor 74 and to the aperture PI, and an L-shaped FPC support plate 76 for supporting aperture FPC 75.

The aperture frame 64 is a ring-shaped member and includes an opening at a center, the aperture drive motor of the aperture FPC 75, an FPC support portion (not shown), which supports the side end of the aperture PI, and the like. Further, the aperture frame 64 includes a plurality of aperture blade support pins (not shown) for rotatably supporting the plurality of aperture blades 67, a support portion (not shown) for supporting the aperture drive motor 74, and a support portion (not shown) for supporting the aperture PI each disposed therein. Further, the aperture frame 64 includes three screw holes 64b formed around the outer periphery thereof, and inner peripheral screw portion (female screw) 64a which is formed to a rear side opening thereof and in which a third group lens hold frame 62 is screwed. Screws 7P having cam followers 68B fitted thereon are screwed in the screw holes 64b, the cam followers 68B having cam followers 68A rotatably fitted thereon. The cam followers 68A are rotatably and slidably inserted into the straight moving grooves 81m of the fixed ring 81, and the cam followers 68B are slidably inserted into the cam grooves 85d of the cam ring 85.

The aperture drive plate 66 is a disc-shaped member having an opening at a center, has a gear portion on an outer periphery, and is rotatably supported by the aperture frame 64. When an aperture is adjusted, the aperture drive plate 66 is driven in rotation by a pinion 74a of the aperture drive motor 74 through the gear portion. The aperture blades 67 are opened and closed by the rotation of the aperture drive plate 66.

The third group frame portion includes the third group lens hold frame 62 and the third group lens 61 which comprises a plurality lenses supported by the third group lens hold frame 62.

The third group lens hold frame 62 is a cylindrical frame member and has the third group lens 61 comprising a plurality of lenses and inserted therein, and the third group lens 61 is fixed and held by lens pressers 63A, 63B, and 63C screwed in the third group lens hold frame 62. An outer peripheral screw portion (male screw) 62a is formed on the front end of the third group lens hold frame 62.

The third group lens hold frame 62 is integrated with the aperture frame 64 by screwing the screw portion 62a in the screw portion 64a of the aperture frame 64 and assembled as the third group frame unit 60.

As described below, the optical unit 2 is completed by assembling the cam ring 85 and the third group frame unit 60, and further the first and second group assembled mechanical portions described above, which comprise the second group frame unit 50, the first group frame unit 40, the first group moving frame 44, the filter ring 46, and the like described above, to the fixed ring 81.

That is, the cam ring 85 is fitted on the outer peripheries 81e and 81f of the fixed ring 81 from the rear side thereof and rotatably engaged therewith. The third group frame unit 60 is inserted into the inner periphery 81a of the fixed ring 81 to permit the sliding engagement of the aperture frame 64. In this state, the cam followers 68B, on which the cam followers 68A are fitted, are inserted into the straight moving grooves 81m and the cam grooves 85d, and the screws 7P, on which the cam followers 68B are fitted, are screwed in the screw holes 64b. The third group frame unit 60 is slidably held in the fixed ring 81 by screwing the screws 7P.

Further, the first and second group assembled mechanical portions are assembled to the fixed ring 81 from the front side thereof. At the time, the first group frame 48 is engaged with the inner periphery 81a of the fixed ring 81 and, at the same time, the first group moving frame 44 is fitted on and engaged with the outer periphery of the cam ring 85. Note that, when the first group moving frame 44 is fitted, the cam followers 44A on the inner peripheral side of the first group moving frame 44 are inserted into the insertion grooves 81k of the fixed ring 81, and thereafter the cam followers 44A are inserted into the cam grooves 85c of the cam ring 85.

Then, the screws 7M are inserted into the cam followers 83 and screwed in the screw holes 81h of the fixing ring 81 in the state that the cam followers 83 are inserted into the straight moving grooves 44d of the first group moving frame 44, thereby the first group moving frame 44 is slidably attached to the outer periphery of the fixed ring 81. The screws N are inserted into the stopper members 82 in the state that the cam ring 85 is fitted on the fixed ring 81, and the screws 7N are screwed in the screw portions 81g of the fixed ring 81, thereby the stoppers 82 are fixed to the fixed ring 81. The movement of the cam ring 85 in the optical axis O direction is prevented by the stoppers 82. Then, the focus drive ring 87 is engaged with the rear outer periphery 81j of the fixed ring 81. At the time, the distal end inserting portion 88a of the coupling arm 88 is slidably inserted into the straight moving groove 54b of the focus ring 54.

The optical unit 2, to which the fixed ring 81, the cam ring 85, the first, second, and third group units 40, 50, and 60, the focus drive ring 87, and the like are assembled, is completed by the assembly described above.

In the optical unit 2 assembled as described above, the first group moving frame 44 is guided by the straight moving grooves 44d and the cam followers 83 so as to move straight together with the adjustment frame 45 along the optical axis O direction with respect to the fixed ring 81. The first group frame 48 is guided by the straight moving groove 48f and the cam followers 84 so as to move straight along the optical axis O direction with respect to the fixed ring 81. The second group cam frame 53 is guided by the projection 53e so as to move straight along the optical axis O direction with respect to the first group frame 48. The third group frame unit 60 is guided by the straight moving grooves 81m of the fixed ring 81 and the cam followers 68A so as to move straight along the optical axis O direction.

In the zooming operation, when the cam ring 85 is driven in rotation with respect to the fixed ring 81 in the fixed state (non-rotating state) of the focus drive ring 87, the first group moving frame 44 is moved to a zoom position in the optical axis O direction by the cam followers 44A and the cam grooves 85c together with the first group frame unit 40 and the second group frame unit 50 in an integrated state. The third group frame unit 60 is moved to the zoom position in the optical axis O direction by the cam followers 68B and the cam grooves 85d.

In the focusing operation, when the focus drive ring 87 is driven in rotation with respect to the fixed ring 81 in the fixed state (non-rotating state) of the cam ring 85, the first group moving frame 44 and the adjustment frame 45 are not moved forward and rearward, and the first group frame unit 40 and the second group frame unit 50 are driven to a different focusing position in the optical axis O direction through the cam follower 56A and the cam grooves 48h and 53f by the rotation of the focus ring 54.

Note that the optical unit 2 assembled as described above is shown in the perspective view of FIG. 10.

Next, the detailed structures of the respective components of the exterior unit 1 and a procedure for assembling the components will be explained.

As described above, the exterior unit 1 includes the main frame 11, the distance ring 14, the inside frame 16, the scale ring 21, the zoom ring 26, the rear cover (rear end cover) 31, the lens mount 36, and the cover rear frame 37.

The main frame 11 is a cylindrical member having an axial center along the optical axis O direction and includes a flange-shaped front cover mounting portion formed on a cylinder front end and a screw portion formed on a cylinder rear end surface to mount the fixed ring, the control unit, the lens mount, and the like (FIG. 11). Further, the main frame 11 includes two drive pin escaping holes 11g confronting each other along a peripheral direction, a coupling arm escaping hole 11h, and an FPC mounting recess 11y comprising a minute recess along the circumferential direction each formed around a cylindrical portion, an FPC mounting plane portion 11j and a positioning recess 11i each formed around the rear outer periphery of the cylindrical portion, and a projection 11e formed around the front outer periphery of the cylindrical portion.

In the main frame 11, the ring-shaped front cover 12, which has a seal ring 6A inserted into an inner periphery 12b, is engaged with a front end outer periphery 11b in the state that an O-ring 5A is inserted into the front end outer periphery 11b. The front cover 12 is fixed to the front surface of the main frame 11 by screwing screws 7A, which are inserted into screw insertion holes 11a, in screw holes 12a of the front cover 12.

A distance encoder FPC 13 is bonded to the FPC mounting portion 11y around the outer periphery of cylindrical portion of the main frame 11. The distance encoder FPC 13 has a distance encoder pattern and an FPC extending portion 13b which extends rearward along the optical axis O, and a connector terminal 13a connected to the lens barrel control FPC 102 is disposed to the distal end of the FPC extending portion 13b.

The optical unit 2, to which the first, second, and third group frame units 40, 50, and 60, the fixed ring 81, the cam ring 85, the focus drive ring 87, and the like shown in FIG. 10 described above are assembled, is inserted into the inner periphery of the main frame 11 from the front side thereof, and screws 7V having passed through screw insertion holes 11n, 11p, and 11q of the main frame 11 are screwed in the screw holes 81n, 81p, and 81q, thereby the fixed ring 81 is fixed to the rear end of the main frame 11 (FIGS. 11 and 12).

The focus drive ring 87 can be supported so as to rotate around the rear cylindrical portion 81j of the fixed ring 81 by fixing the fixed ring 81 to the main frame 11 in the state that the movement of the focus drive ring 87 in the optical axis O direction is prevented by the rear inner peripheral end surface 11k of the main frame 11 and the stepped end surface 81t of the fixed ring 81.

Thus, the FPC support plate 76 (FIG. 6), which supports the aperture FPC 75 exposed to the rear portion of the fixed ring 81, is attached to the rear end of the main frame 11. That is, the FPC support plate 76 is attached to the rear end of the main frame 11 by positioning the FPC support plate 76 by fitting positioning holes 76s of the FPC support plate 76 on positioning pins 11s disposed in a recess 11l of the main frame 11 at the rear end thereof and by screwing a screw 7L passed through a screw insertion hole 76r in a screw hole 11r of the main frame 11 (FIGS. 11 and 12).

Subsequently, the distance ring 14, the inside frame 16, the scale ring 21, the zoom table 24, the zoom ring 26, and the rear cover 31 are inserted around and assembled to the outer periphery of the main frame 11 in this order. The detailed structures of the respective members and a procedure for assembling them will be explained.

The distance ring 14 is a circular-ring-shaped member with an opening at a center, and includes the rubber ring 15 engaged around and attached to the outer periphery thereof and a slit disc 14A positioned by a recess 14b and attached around the inner periphery thereof. The slit disc 14A is a member comprising a thin plate and has an opening at a center, slits along a radial direction formed in a peripheral direction, and four positioning projections 14Ab formed around the outer periphery thereof and engaged with recesses 14b of the distance ring 14.

The inside frame 16 is a circular-ring-shaped member with an opening at a center and includes a window opening in a part of the peripheral surface of an upper ring portion, and a transparent window member 17 bonded and fixed to the outside surface of the window opening. Two PI mounting recesses 16d and one rotation preventing recess 16e are disposed to the front end of the inside frame 16, and an engaging abutment portion 16p to the zoom table 24 is disposed to the rear surface thereof. A pair of distance PIs (photo interrupters) 19 mounted on an FPC 18 for the distance PIs are inserted into the recesses 16d. The distance PIs 19 are fixed to the recess 16d by being pressed by a PI presser 20 as a sheet spring member and by screwing a screw 7B in a screw hole 16g of the inside frame 16.

The FPC 18 for the distance PIs has the pair of distance PIs 19 attached to an end thereof, and the other end thereof extends rearward along the optical axis O and has a connector terminal 18a at the distal end thereof, the connector terminal 18a being connected to the lens barrel control FPC 102.

The scale ring 21 is a circular-ring-shaped member with an opening at a center and includes an outer periphery 21b rotatably engaged with the inner periphery 16b of the inside frame 16. The scale ring 21 has a projection 21d extending from the upper portion thereof in the optical axis O direction, a screw hole 21c is formed on the projection, and a distance piece 22 is attached to the inside of the projection using a screw 7C. Further, a distance indicator 21e from the nearest distance to the infinite distance is formed around an upper outer periphery of the scale ring 21 in correspondence to respective positions of rotation of the scale ring 21 to indicate the distance of an object focused by the second and third group lenses 51 and 61 (focus lenses) moved forward and rearward in association with the rotation of the scale ring 21. The coupling arm 23 is fixed to the lower portion of the scale ring 21 by screws 7D passed through screw insertion holes 23b.

The coupling arm 23 is a truly straight metal sheet member extending rearward in parallel with the optical axis O and has the engaging portion 23c formed at the distal end thereof by bending it to an inner peripheral side.

When the distance ring 14, the inside frame 16, and the scale ring 21 are assembled to the main frame 11, the distance ring 14 and the inside frame 16 are fitted on the front portion of the outer periphery of the main frame 11 from the rear end thereof in the state that the slit disc 14A is previously inserted into the interval of a detecting portion of the distance PIs 19 on the inside frame 16 side as well as the distal end of the inside frame 16 is rotatably inserted into the inner periphery 14a of the distance ring 14. In the fitting operation, an O-ring 5B is inserted into a ring groove 16c in the front portion of the inside frame 16, and the inner periphery 14a of the distance ring 14 is abutted against the outer periphery of the O-ring 5B.

Further, the scale ring 21 is inserted into the inner periphery of the inside frame 16 from a rear side. At the time, the engaging portion 23c of the coupling arm 23 is inserted into the coupling arm escaping hole 11h of the main frame 11 and engaged with the engaging fork portion 87b of the focus drive ring 87 previously assembled in the main frame 11 (FIG. 6).

In the state that the distance ring 14, the inside frame 16, and the scale ring 21 described above are assembled to the main frame 11, the front end surface of the inside frame 16 is abutted against the side surface in the optical axis direction of a rib-shaped projection 11d disposed in a peripheral direction on the outer peripheral surface 11f of the main frame 11 as well as the rotation preventing recess 16e is engaged with and supported by the projection 11e of the main frame 11. Accordingly, the rotation of the inside frame 16 is prevented with respect to the main frame 11, and the distance ring 14 is positioned in the optical axis O direction so as to rotate on the main frame 11. The distance ring 14 is supported together with the slit disc 14A so as to be manually rotated in such a state that the forward movement of it is prevented because it is engaged with and supported by an outer peripheral collar 11c and the projection (outer periphery) 11d of the main frame 11 in a radial direction and further is in sliding contact with the side surface in the optical axis O direction of a rib-shaped projection 11k1 in a peripheral direction disposed around the outer periphery 11f of the main frame 11. The scale ring 21 is rotatably supported by the focus drive ring 87 in the state that the forward movement thereof is prevented because it is engaged with the inner periphery of the inside frame 16.

The engaging abutment portion 16p at the rear end of the inside frame 16 is abutted against an engaging abutment portion 24p at the front end of the zoom table 24 to be described later in the radial direction, and they are abutted against each other through an O-ring 5C in an axial direction, thereby the rearward movement and the radial movement of the inside frame 16 and the distance ring 14 are prevented. The rearward movement of the scale ring 21 is also prevented by the engaging abutment portion 24p of the zoom table 24. Note that the O-ring 5C is inserted into the peripheral groove of the engaging abutment portion 24p of the zoom table 24 and held by being pressed by the rear end surface of the engaging abutment portion 16p of the inside frame 16.

When the distance ring 14 is rotated, the slit disc 14A, which is rotated together with the distance ring 14, is relatively moved between the distance PIs 19 fixed to the inside frame 16, thereby an output from the distance PIs 19 generated by manipulating the distance ring is transmitted to the FPC 18 for the distance PIs. Further, since the distance piece 22 attached to the scale ring 21 is in sliding contact with the encoder pattern of the distance encoder FPC 13 on the outer periphery of the main frame 11, a rotation position output from the scale ring 21 is transmitted to the distance encoder FPC 13 side. Note that, in the assembled state, the connector terminal 13a side of the distance encoder FPC 13 and the connector terminal 18a side of the FPC 18 for the distance PIs extend to the rear side of the main frame 11.

The zoom table 24 is a cylindrical member whose axial center extends along the optical axis O direction and has an inner periphery 24f slidably fitted on the outer periphery 11f of the main frame 11. The engaging abutment portion 24p to the inside frame 16 and a front collar 24c are disposed to the front end of the zoom table 24, and an outer peripheral stepped portion 24m having a slightly smaller diameter is formed to the rear end thereof. Two drive pin insertion slots 24g extending in a peripheral direction, a connector escaping cutout portion 24j, an FPC mounting recess 24y, and an FPC insertion hole 24h are formed on a cylindrical portion of the zoom table 24, and a rotation preventing projection 24i is disposed to the rear end of the inner periphery of the zoom table 24.

A zoom encoder FPC 25 having a zoom encoder pattern is bonded to the FPC mounting recess 24y. The zoom encoder FPC 25 has an extending portion 25b extending to the rear side of the main frame 11 passing through the FPC insertion hole 24h, and a zoom encoder connector terminal 25a is disposed to the distal end of the extending portion 25b.

The zoom ring 26 is a cylindrical member whose axial center extends along the optical axis O direction and has a cylindrical inner periphery 26d fitted on the cylindrical outer periphery of the zoom table 24. A distal end outer periphery 26q with a predetermined width and a front inner periphery stepped portion 26c are formed to the front end of the zoom ring 26. The distal end outer periphery 26q is a large diameter stepped portion which is slightly larger than a cylindrical portion 26a and has a zoom indicator 26r attached thereto, and the front inner periphery stepped portion 26c is engaged with the outer periphery of the front collar 24c of the zoom table 24 in a radial direction and in sliding contact with a side of the front collar 24c in the optical axis O direction. Further, a rear inner periphery stepped portion 26m slightly smaller than the inner periphery of the zoom ring and an engagement abutting portion 26p to the rear cover 31 are formed to the rear end of the zoom ring 26.

Further, two drive pin slots 26b, into which drive pins 86 can be inserted approximately in confrontation with each other and which are slightly longer in the optical axis O direction, and a recess 26e, to which a zoom encoder contact piece 27 is attached, are disposed around the cylindrical portion 26a of the zoom ring 26. Note that a predetermined space is formed between the cylindrical inner periphery 26d and the cylindrical outer periphery of the zoom table 24 so that the zoom encoder is interposed therebetween.

A contact piece exposure opening 26f is disposed to a central portion of the recess 26e, locking holes 26g and 26h are formed to the end in a peripheral direction of the recess 26e, and the zoom encoder contact piece 27 and a contact piece cover 28 for pressing and holding the rear surface of the zoom encoder contact piece 27 are inserted thereinto. The contact piece cover 28 has locking projections 28g and 28h disposed to both the ends thereof, and when the contact piece and the cover are mounted, the removal thereof can be prevented by locking the locking projections 28g and 28h to the locking holes 26g and 26h.

The rear cover 31 is a circular-ring-shaped member and includes an engagement sliding contact portion 31p, which is disposed to the front end thereof so as to be engaged with the zoom ring 26, and a peripheral rear abutment portion 31k formed around the inner periphery at the rear end thereof. Screw insertion holes 31v and 31w are formed on the rear abutment portion 31k. Further, ventilation hole groups 31b are disposed at two positions around a cylindrical periphery which is short in the optical axis O direction. Cover support holes 31c are formed to both the ends and the center of each ventilation hole group 31b.

Two water-repellent sheets 33 are placed on the ventilation hole groups 31b and covered with a water-repellent sheet cover 32 so as to close the ventilation hole groups 31b. The water-repellent sheet cover 32 is bonded and fixed by inserting support pins 32c into the cover support holes 31c. A minute space, which communicates with the atmosphere, is formed between the water-repellent sheet cover 32 and the water-repellent sheets 33.

The zoom table 24, the zoom ring 26, and the rear cover 31 are sequentially assembled to the outer periphery of the exterior unit 1 to which the distance ring 14, the inside frame 16, and the scale ring 21 are assembled.

First, the zoom encoder FPC 25 is bonded to the recess 24y of the zoom table 24, further the O-ring 5C is inserted into a ring groove on the front surface of the engaging abutment portion 24p of the zoom table 24, and an O-ring 5D is inserted into a ring groove 24d around the outer periphery of the zoom table 24. The zoom table 24 is fitted on the outer periphery 11f of the main frame 11 from a rear side, and the front engaging abutment portion 24p is engaged with and abutted against the rear engaging abutment portion 16p of the inside frame 16. The projection 24i at the rear end of the zoom table 24 is engaged with the rotation preventing recess 11i at the rear end of the main frame 11, thereby the zoom table 24 is positioned in a rotational direction.

Then, the zoom ring 26 is fitted on the outer periphery of the zoom table 24 while placing the distal end outer periphery 26q to a front side. That is, the front inner periphery step portion 26c of the zoom ring 26 is engaged with and abutted against the collar 24c of the zoom table 24, and, at the same time, the internal diameter of the rear inside periphery stepped portion 26m of the zoom ring 26 is engaged with the outside diameter of the stepped portion 24m of the zoom table 24.

Here, a detailed arrangement of the control unit 3 comprising the focus lens drive unit 101 and the lens barrel control FPC 102 will be explained using FIG. 7.

The focus lens drive unit 101 is soldered to the lens barrel control FPC 102 through motor lead wires 125 from a motor 121, and disposed adjacent to the lens barrel control FPC 102 through an FPC 102e for a motor PI, and includes a speed reduction gear box 122, in which a speed reduction gear train and the reduced speed output gear 123 are built in, the focus motor 121 supported through the gear box 122, a motor PI 112 for detecting the amount of rotation of a motor output gear of the focus motor 121, and a mounting plate 124. The focus motor 121, the speed reduction gear box 122 and the motor P1 are fixed by screws through the mounting plate 124.

An FPC support plate 103 is bonded to the rear surface portion of the lens barrel control FPC 102 to accommodate the FPC 102 in the lens barrel in a predetermined shape and to attach it thereto. As shown in FIGS. 7 and 9, the FPC support plate 103 has a main portion 103e and a bent portion 103a continuous to the main portion 103e. The main portion 103e has a flat surface which supports a main FPC portion of the lens barrel control FPC 102 and is parallel to a lens barrel optical axis. The bent portion 103a is somewhat bent along a line parallel to the lens barrel optical axis O and supports a main FPC 102a that is a flat surface disposed in the peripheral direction of the lens barrel and parallel to the lens barrel optical axis O. The FPC support plate 103 further includes an attachment portion 103b as a flat surface which is continuous to the main portion 103e, bent, and orthogonal to the optical axis O of the lens barrel so as to be attached to the main frame 11. Screw insertion holes 103c and 103d are formed to the attachment portion 103b.

The lens barrel control FPC 102 is an FPC having electric parts (IC 105, and the like) mounted on a surface thereof except PI 112. As shown in FIGS. 7 and 8, the lens barrel control FPC 102 includes an FPC portion 102i, the main FPC 102a, an FPC portion 102h, relay FPC portions 102c, an FPC portion 102d, the FPC portion 102e, and a ground FPC 102f. The FPC portion 102i is bonded to the rear surface of the main portion 103e of the FPC support plate 103. The main FPC 102a is continuous to the FPC portion 102i and bonded to the rear surface of the bent portion 103a. The FPC portion 102h is continuous from an end of the main FPC 102a, bent, and bonded to the front surface of the bent portion 103a, and has a distance encoder FPC connector 107, a zoom encoder FPC connector 108, and an aperture FPC connector 109 mounted on a mounting surface thereof. The relay FPC portions 102c are continuous to the FPC portion 102i and a part thereof is bonded to the front surface of the main portion 103e. The FPC portion 102d is continuous from the relay FPC portions 102c and has the mount contact member 111 mounted thereon. The FPC 102e extends from the FPC portion 102d and has the motor PI 112 mounted to the distal end of the surface opposite to the mounting surface on which the other electric parts are mounted. The ground FPC 102f is disposed to project from the FPC portion 102i. The lens barrel control FPC 102 further includes a connector mounting portion 102b, on which a distance PI connector 110 is mounted, the connector mounting portion 102b being located in a portion projecting from the main FPC 102a. Note that, as to the front surface and the rear surface in the explanation of the lens barrel control FPC 102 described above, the front surface is a surface which can be seen from the lens barrel optical axis O when the support plate 103 and the FPC 102 are assembled in the lens barrel, and a surface opposite to the front surface is the rear surface.

The mount contact member 111 has a lens mount contact 111a disposed on a rear end surface, the lens mount contact 111a being a communication contact to a camera body side. The lens mount contact 111a is connected to the lens barrel control FPC 102 through the relay FPC portions 102c.

After the fixed ring 81 is coupled with the main frame 11 and before the rear cover 31 is attached and before the connectors of the respective FPCs are connected, the focus motor 121 is inserted into the fixed ring 81 from the rear side of the main frame 11, as shown in FIGS. 11, 12 and 13. Then, the speed reduction gear box 122 is positioned in a gear box positioning recess 11o on the rear surface of the mainframe 11 by a pair of pins 11t disposed to the flat surface of the recess while meshing the output gear 123 of the speed reduction gear train with an internal gear portion 87c of the focus drive ring 87. Thereafter, two screws 7T are inserted into screw insertion holes 122s and 122r of the speed reduction gear box 122 (FIG. 7) and screwed in screw holes 81s and 81r of the fixed ring 81, thereby the speed reduction gear box 122 and the focus motor 121 are fixed to the rear end of the fixed ring 81.

Further, the FPC support plate 103, with which the lens barrel control FPC 102 is integrated, is inserted into the main frame 11 from the rear side thereof, and the attachment portion 103b of the FPC support plate 103 is attached to a support plate attachment recess 11z of the main frame 11 at the rear end thereof as shown in FIGS. 12 and 13. Screws 7U are inserted into the screw insertion holes 103c and 103d of the attachment portion 103b and screwed in screw holes 11u of the main frame 11, thereby the attachment portion 103b is fixed to the main frame 11. The lens barrel control FPC 102 is accommodated in and fixed to the rear end of the main frame 11 by fixing the attachment portion 103b. That is, the lens barrel control FPC 102 is held in the fixed ring 81 as a fixed frame and in the inner periphery of the main frame 11.

In the state before the rear cover 31 is attached, an FPC connector terminal is connected to the respective connector terminals mounted on the lens barrel control FPC 102. That is, the connector terminal 13a of the distance encoder FPC 13 is connected to the distance encoder FPC connector 107. The zoom encoder connector terminal 25a of the zoom encoder FPC 25 is connected to the zoom encoder FPC connector 108. A connector terminal 75a of the aperture FPC 75 is connected to the aperture FPC connector 109. The connector terminal 18a of the FPC 18 for the distance PIs is connected to the distance PI connector 110.

The rear cover 31 in the state that an O-ring 5E is mounted in the ring groove of the engaging abutment portion 31p is inserted into the rear end of the main frame 11 behind the zoom ring 26. Then, the engaging abutment portion 31p of the rear cover 31 is engaged with the engagement abutting portion 26p in a rear portion of the zoom ring 26, and the engagement abutment portion 26p is abutted against the engaging abutment portion 31p through the O-ring 5E while compressing the O-ring 5E. At the time, a rear abutment portion 31k of the rear cover 31 is abutted against the rear end surface of the zoom table 24. Screws 7E passed through the screw holes 31v and 31w of the rear cover 31 are screwed in screw holes 11v and 11w of the main frame 11 (FIG. 11), thereby the rear cover 31 is fixed to the main frame 11.

After or before the rear cover 31 is mounted, drive pins 86 are passed through the drive pin slots 26b of the zoom ring 26, further passed through the drive pin insertion slots 24g of the zoom table 24, and screwed in the drive pin screw holes 85b of the cam ring 85 previously assembled in the main frame 11. Further, the zoom encoder contact piece 27 is inserted into the recess 26e of the zoom ring 26, and the contact piece cover 28 is mounted on the rear surface of the contact piece. In the mounted state of the contact piece cover 28, the rubber ring 29 is fitted on the outer periphery of the zoom ring 26.

In the state that the zoom table 24, the zoom ring 26, and the rear cover 31 are assembled, the zoom table 24 is pressed against the main frame 11 in the optical axis O direction from the rear side thereof by the rear cover 31, thereby the zoom table 24 is supported while both the rotation and the axial movement thereof being prevented. The zoom ring 26 is also pressed against the main frame 11 in the optical axis O direction from the rear side thereof by the rear cover 31 and rotatably supported with respect to the zoom table 24 in the state that the axial movement thereof is prevented. Further, the movement of the inside frame 16 and the scale ring 21 rearward in the optical axis O direction is also prevented through the zoom table 24.

In the above assembled state, the cam ring 85, which is located on the optical unit 2 side, is driven in rotation through the drive pins 86 by the rotation of the zoom ring 26. The zoom encoder contact piece 27 is caused to slide on the pattern of the zoom encoder FPC 25 by the rotation of the zoom ring 26. Accordingly, in an actual operating state, a zoom encoder signal is output to the FPC 102 side through the connector terminal 25a of the zoom encoder FPC 25.

Thereafter, the mount contact member 111 mounted on the lens barrel control FPC 102 is attached to the lens mount 36, which will be described later, and the lens mount 36 is attached to the rear end surface of the main frame 11.

As shown in FIGS. 1, 2, and 4, the lens mount 36 includes an opening 36a, a bayonet claw portion 36i disposed to a rear side of a flange portion, a mount contact member mounting recess 36b formed on the inner periphery of the flange portion, and motor mounting plate escaping recesses 36c, a lens mount locking engagement hole 36g to the camera body, and screw insertion holes 36d, and the like formed on a front surface side of the flange portion.

The cover rear frame 37 includes a cylindrical portion 37a, which can be engaged with the outer periphery of the third group lens hold frame 62 and has light shield line, an escaping recess 37c, a mount contact member escaping cutout 37b, and screw insertion holes 37e disposed to a flange portion.

When the lens mount 36 is attached to the rear end surface of the main frame 11, first, the mount contact member 111 is inserted into the contact member mounting recess 36b of the lens mount 36, and screws 7G passed through screw insertion holes 36f of the lens mount 36 are screwed in screw holes 111b of the mount contact member 111 (FIG. 7), thereby the mount contact member 111 is fixed to the lens mount 36. Then, screws 7F are passed through the screw insertion holes 36d of the lens mount 36 and screwed in screw holes 11x of the rear end surface of the main frame 11, thereby the lens mount 36 is fixed to the main frame 11 and to the rear end surface of the rear cover 31.

When the lens mount 36 is attached, a single or a plurality of space seat plates (spacers) 35 having a proper thickness are selected to adjust the amount of flange back of the optical system of the optical unit 2 assembled in the main frame, mounted on the main frame 11 and the rear end surface the rear cover 31, and the lens mount 36 is fixed in the state that the space seat plates 35 are sandwiched therebetween.

Further, when the lens mount 36 is attached, it is attached to the main frame 11 in the state that a seal ring 6B as a packing member is inserted to the outer periphery of the lens mount 36 and to the stepped portion of the rear end surface of the rear cover 31.

Thereafter, the cylindrical portion of the cover rear frame 37 is inserted into the opening 36a of the lens mount 36, and screws 7H are inserted into the screw insertion holes 37e and screwed in screw holes 36e of the lens mount 36, thereby the cover rear frame 37 is attached to the lens mount 36.

The assembly job of the lens barrel 10, which comprises the exterior unit 1, the optical unit 2, the control unit 3, and the like, is completed by attaching the lens mount 36 and the cover rear frame 37 described above.

Next, a forward/rearward moving operation of the lens barrel 10 described above will be explained.

In the lens barrel 10, when the zoom ring 26 is rotated through the rubber ring 29 to execute zooming, the first, second, and third group frame units 40, 50, and 60 and the focus ring 54 are moved forward and rearward to a desired zoom position in the optical axis O direction by the rotation of the cam ring 85. The position of rotation of the zoom ring 26 in the zooming is transmitted to the lens barrel control FPC 102 side through the zoom encoder FPC 25 and output to a mounted camera body as a zoom position signal.

Subsequently, when the distance ring 14 is rotated through the rubber ring 15, the amount of rotation and the rotating direction of the distance ring 14 are detected by the pair of distance PIsl9. The output of the amount of rotation is transmitted to the lens barrel control FPC 102 side through the FPC 18 for the distance PIs, thereby the focus motor 121 is driven in rotation to make focusing at a distance corresponding to the output of the amount of rotation. In contrast, when focusing distance data is captured from the mounted camera body side to the lens barrel control FPC 102 through the lens mount contact 111a, the focus motor 121 is driven in rotation by a predetermined amount in a necessary direction based on the focusing distance data.

When the focus motor 121 is driven in rotation, the focus drive ring 87 is driven in rotation, and the focus ring 54 is driven in rotation at a fixed position in the optical axis direction through the coupling arm 88. The first group frame 48 (first group lens holding frame 42) is moved forward and rearward along the cam grooves 48h of the first group frame 48 by the rotation of the focus ring 54. At the same time, the second group lens holding frame 52 is moved forward and rearward along the cam grooves 53*f* of the second group cam frame 53 in a direction different from that of the first group frame 48, and the first and second group lenses 41 and 51 are moved to the focusing positions thereof.

The rotation of the focus drive ring 87 is transmitted to the scale ring 21 through the coupling arm 23. The rotating position signal of the scale ring 21 is transmitted to the lens barrel control FPC 102 side through the distance encoder FPC 13 and further transmitted to the camera body side through the lens mount contact 11*a*. At the same time, the amount of rotation of the focus motor 121 is detected by the motor PI 112 and transmitted to the lens barrel control FPC 102 side.

When an aperture is to be driven in the lens barrel 10, an aperture signal is captured to the lens barrel control FPC 102 side through the lens mount contact 111*a* and converted into an aperture drive motor drive signal. The aperture drive motor drive signal is transmitted to the aperture drive motor 74 through the aperture FPC 75, thereby the aperture blades 67 are driven in rotation through the aperture drive plate 66. An full open position (reset position) signal of the aperture drive plate 66 is detected by the aperture PI and captured to the lens barrel control FPC 102 through the aperture FPC 75.

Next, the forward/rearward moving positions of the respective lenses and the aperture (that is, the forward/rearward moving positions of the respective lens frames and the aperture frame) with respect to the rotation of the zoom ring and the focus drive ring in the zooming and focusing of the lens barrel 10 will be explained using FIGS. 1, 2, 14, and the like.

Figure 14:
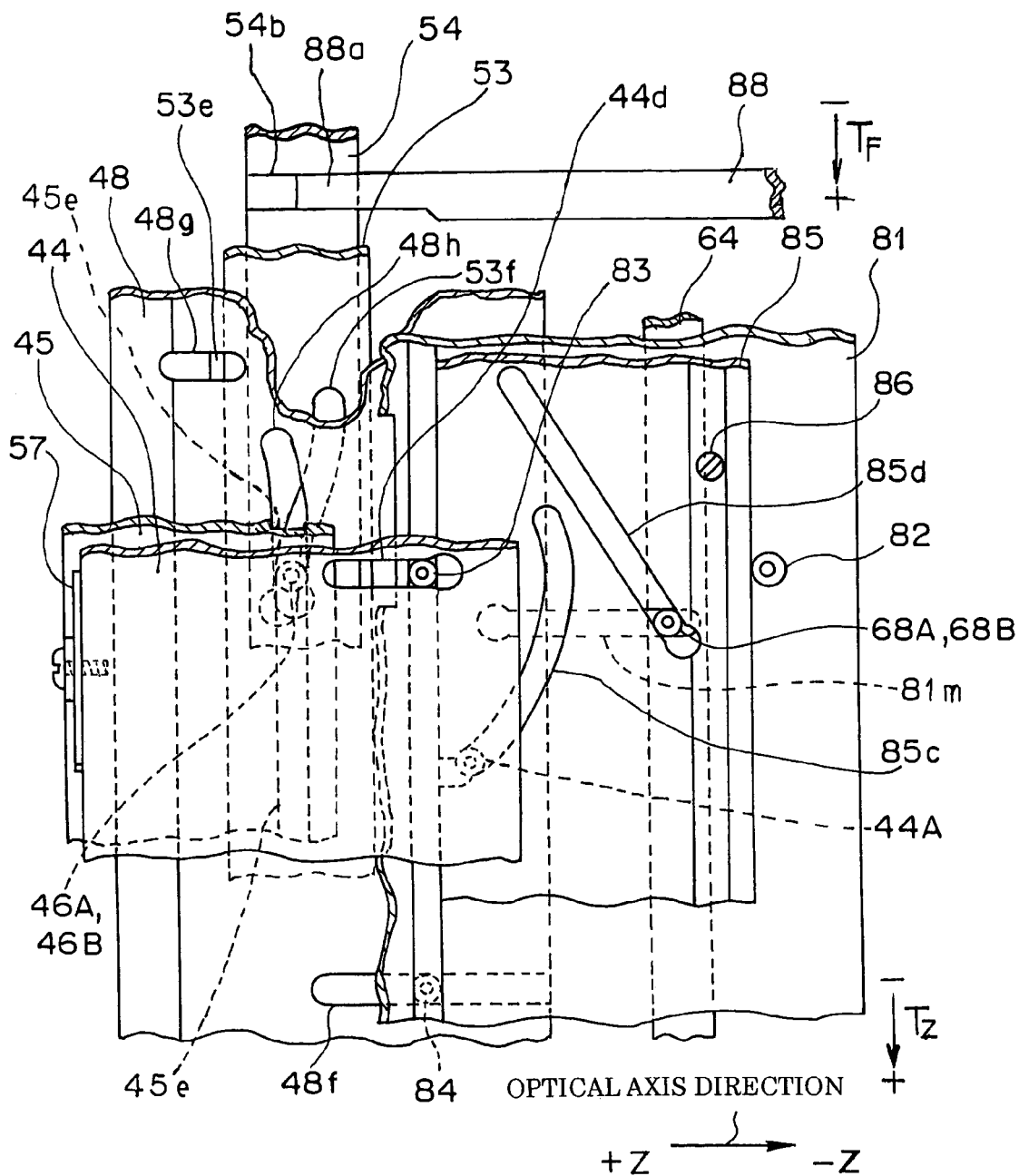
FIG. 14 is a developed view of a part of a fixed ring, a cam ring, a first group frame, a second group cam frame, and an aperture frame in a wide state as well as in an infinite focusing state of the lens barrel of FIG. 1 when they are viewed from an outer peripheral side.

FIG. 14 is a developed view of a part of the fixed ring, the cam ring, the first group frame, the second group cam frame, and the aperture frame in a wide state and in an infinite focusing state of the lens barrel when they are viewed from an outer peripheral side.

Note that, in the following explanation, the clockwise rotating direction TZ of the cam ring 85 is shown by + and the counterclockwise rotating direction thereof is shown by − in the wide/telescopic zooming of the lens barrel 10. The clockwise rotating direction TF of the focus drive ring 87 is shown by +, and the counterclockwise rotating direction TF thereof is shown by − n infinite/nearest focusing.

It is assumed that the lens barrel 10 is in a wide state shown in FIG. 1. When zooming is executed from the wide state to a telescopic state, the focus drive ring 54 is held in a non-rotating state. When the cam ring 85 is rotated in the +TZ direction, the first group moving frame 44 is retracted in approximately −Z direction by the cam grooves 85*c* of the cam ring 85 while being straight guided by the cam followers 83 of the fixed ring 81. The movement of the first group moving frame 44 in the optical axis O direction is transmitted to the first group frame 48 and to the second group cam frame 53 through the cam followers 56B and 56A of the focus ring 54. Note that when the first group moving frame 44 is moved, the first group frame 48 is straight guided in the optical axis O direction by the cam followers 84 of the fixed ring 81, and the second group cam frame 53 is straight guided in the optical axis O direction by the straight moving groove 48*g* of the first group frame 48. The first group lens holding frame 42 (first group lens 41), which is fixed to and supported by the first group frame 48, and the second group lens holding frame 52 (second group lens 51), which is fixed to and supported by the second group cam frame 53, are retracted together to the position of the telescopic state shown in FIG. 2 through the cam followers 56B and 56A of the focus ring 54.

In contrast, the aperture frame 64 is extended in a +Z direction by the cam grooves 85*d* of the cam ring 85 through the cam followers 68B in the state that it is straight guided together with the third group lens hold frame 62 by the straight moving grooves 81*m* of the fixed ring 81. The aperture blades 67 supported by the aperture frame 64 and the third group lens hold frame 62 (third group lens 61) fixed to and supported by the aperture frame 64 are extended to the position of the telescopic state shown in FIG. 2.

Note that when zooming is executed from the telescopic state to the wide state, the respective frame members are moved forward and rearward in a direction opposite to the operation described above by rotating the cam ring 85 in the −TZ direction.

Next, the case, in which the lens barrel 10 executes focusing in respective zooming states, will be explained.

It is assumed that the lens barrel 10 is in an infinite focusing state in the wide state shown in FIG. 1. When focusing is executed to the nearest side from the above state, the cam ring 85 is held in a non-rotating state, and the focus drive ring 87 is driven in rotation in a −TF direction a rotating position corresponding to the distance of an object. When the focus drive ring 87 is rotated, the focus ring 54 is rotated together with it through the coupling arm 88 without being moved forward and rearward in the optical axis O direction. The first group frame 48 is slightly retracted in the optical axis O direction by the rotation of the focus ring 54 through the cam followers 56B and the cam grooves 48*h*. Further, the second group cam frame 53 is extended in the optical axis O direction through the cam followers 56B and the cam grooves 53*f*. The first group lens holding frame 42 (first group lens 41) and the second group lens holding frame 52 (second group lens 51) fixed to the first group frame 48 and the second group cam frame 53, respectively are retracted or extended to the nearest side focusing position, respectively.

Note that a forward/rearward drive is also executed in the same direction when focusing is executed in the direction of the nearest position from the infinite focusing state in the telescopic state shown in FIG. 2. Further, when focusing is executed from the nearest focusing position to the infinite position in respective zoom states, the focus drive ring 87 is driven in rotation in the −TF direction, and the respective frame members are moved forward and rearward in a direction opposite to the case described above.

As described above, in the lens barrel 10, after the optical unit 2, in which the respective optical systems are assembled, is fixed to the main frame 11, the exterior unit 1 is assembled by sequentially assembling the distance ring 14, the inside frame 16, the scale ring 21, the zoom table 24, the zoom ring 26, and the rear cover 31, which are members including components for forming a part of the outside appearance of the exterior unit 1, thereby the lens barrel 10 has an excellent assembling property and productivity can be improved thereby Since the O-rings 5A to 5F, the seal rings 6A and 6B, the water-proof ring 6C, and the like are sandwiched between the abutment/sliding surfaces of the respective outside appearance members of the lens barrel 10 in an elastically compressed and deformed state, the water-proof property of the lens barrel can be sufficiently exhibited.

Further, occurrence of a pressure difference between the interior of the lens barrel 10 and the atmospheric pressure, which is caused by the change of volume of the lens barrel due to the zooming of the lens barrel, can be prevented in such a manner that air is caused to come in and come out from the lens barrel through the ventilation hole groups 31*b* disposed to the rear cover 31 in the peripheral direction thereof and through the water-repellent sheets 33 disposed on the outside surface of the ventilation hole groups 31*b*. Further, invasion of water droplets is prevented by the water-repellent sheets 33.

The respective connection FPCs, the FPC of the control unit 3, lead wires, and the like can be securely prevented from coming into contact with the movable members such as the third group lens hold frame 62, and the like as a drive member by attaching the cover rear frame 37 to the inside of the lens mount 36.

In particular, in the lens barrel 10, the first, second, and third group lens holding frames 42, 52, and 62 are moved forward and rearward to respective zoom positions by the rotation of the cam ring 85 in zooming, further, the focus ring 54 is driven in rotation about the optical axis O through the coupling arm 88 by the rotation of the focus drive ring 87 in focusing, the first group frame 48 and the second group cam frame 53 are moved forward and rearward to a different side in the optical axis O direction along the respective cam grooves by the cam follower 56A of the focus ring, and the first group lens holding frame 42 and the second group lens holding frame 52 are moved to desired focusing positions, respectively. According to the lens barrel 10 arranged as described above, the plurality of lens groups can be moved forward and rearward in a different direction and in a different amount of movement in focusing, and moreover the lens barrel can be reduced in size.

Figure 15:
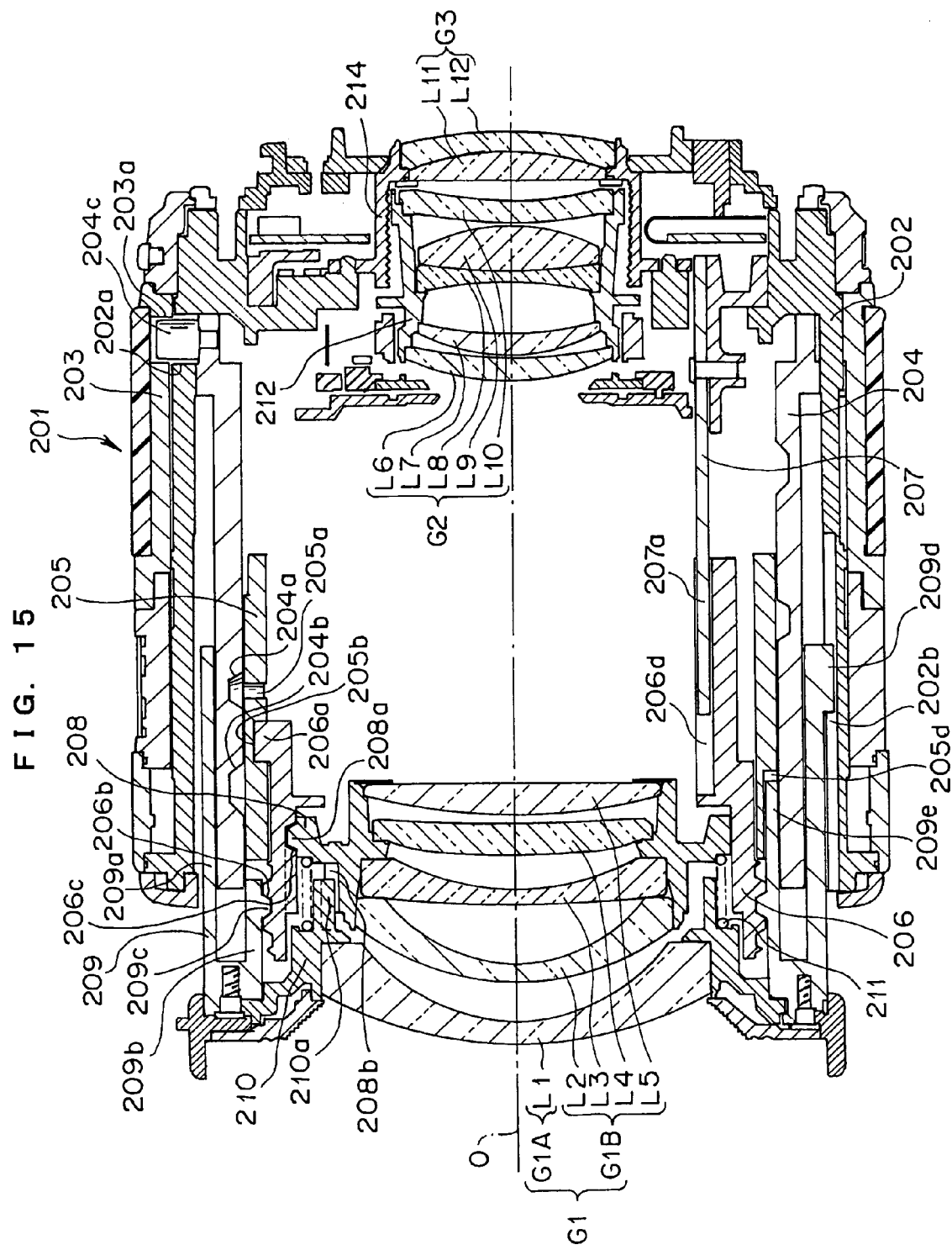
FIG. 15 is a sectional view along an optical axis showing a zoom lens barrel in a second embodiment of the present invention when a zoom position is located at a wide end and a focus position is located at infinity.
Figure 16:
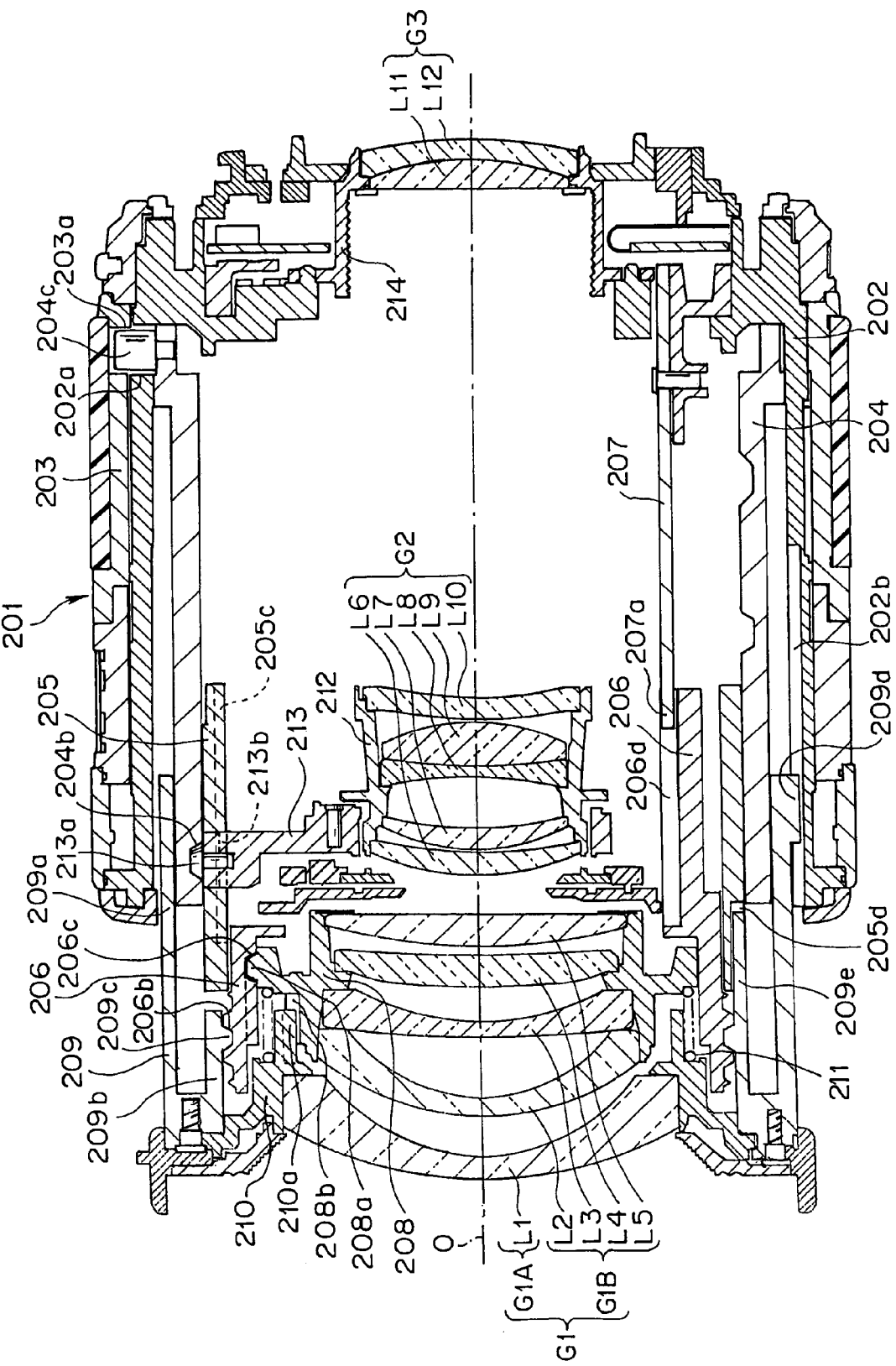
FIG. 16 is a sectional view along the optical axis showing the zoom lens barrel in the second embodiment when the zoom position is located at a telescopic end and the focus position is located at infinity.
Figure 17:
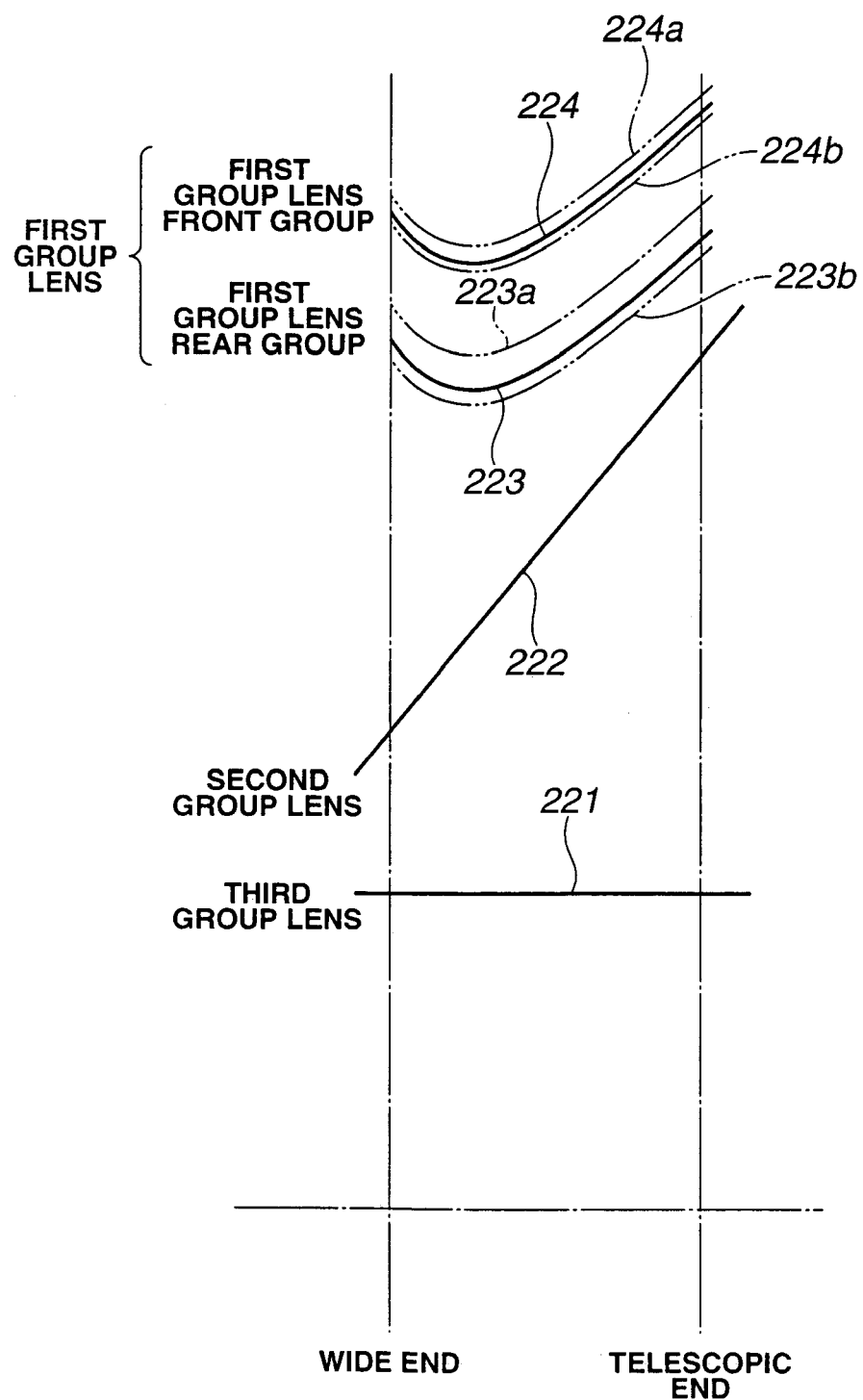
FIG. 17 is a diagrammatic view in which a vertical axis shows the amounts of movement of respective lens groups in an optical axis direction in a zoom operation and in a focus operation, and a lateral axis shows a zoom position.

FIGS. 15 to 17 show a second embodiment of the present invention, wherein FIG. 15 is a sectional view along an optical axis showing a zoom lens barrel when a zoom position is located at a wide end and a focus position is located at infinity, FIG. 16 is a sectional view along the optical axis showing the zoom lens barrel when the zoom position is located at a telescopic end and the focus position is located at infinity, and FIG. 17 is a diagrammatic view in which a vertical axis shows the amounts of movement of respective lens groups in an optical axis direction in a zooming operation and a focusing operation, and a lateral axis shows a zoom position.

Note that, in the second embodiment, only the portions relating to the present invention will be mainly explained, and the explanation of the general arrangement, and the like of the zoom lens barrel will be appropriately omitted.

Further, in the zoom lens barrel 201, an object side (left side in FIGS. 15 and 16) is called a front side, and the like, and a side opposite to the object side (right side in FIGS. 15 and 16) is called a rear side, and the like.

An image pickup lens as an image pickup optical system comprises twelve lenses of lenses L1 to L12. A first group lens G1 comprises the lenses L1 to L5 of the above lenses, a second group lens G2 comprises the lenses L6 to L10, and a third group lens G3 comprises the lenses L11 and L12, respectively. Further, the lens L1 of the lenses constituting the first group lens G1 constitutes a first group lens front group G1A as a first lens group, and the lenses L2 to L5 constitute a first group lens rear group G1B as a second lens group, respectively. The lenses L4 and L10 of the twelve lenses are asymmetrical lenses.

A fixed frame 202 as a first frame of the zoom lens barrel 201 is fixed to a camera main body through a lens mount. A peripheral hole 202*a*, which is formed in an arc shape about the optical axis O direction, is formed to the rear end side of the fixed frame 202, and a key groove 202*b* as straight movement means in the optical axis direction is formed to the front side thereof, respectively.

A zoom rotary ring 203, which changes the focal distance of an image pickup lens (executes zooming) is attached to the rear side of the outer periphery of the fixed frame 202 so as to be rotatable respect to the fixed frame 202. An engagement hole 203*a* is formed to the rear end side of the zoom rotary ring 203.

Further, a zoom rotary frame 204 as a second frame (as well as zoom drive means, a cam frame) is rotatably attached to the inside of the fixed frame 202 such that the movement thereof in the optical axis direction is prevented with respect to the fixed frame 202 by, for example, a not shown stop ring. Accordingly, the zoom rotary frame 204 is arranged such that it can be rotated about the optical axis O within a predetermined angle range with respect to the fixed frame 202.

A pin 204*c* is fixed to the rear end side of the zoom rotary frame 204 so as to project in a radial direction. The pin 204*c* passes through the peripheral hole 202*a* of the fixed frame 202 and is engaged with the engagement hole 203*a* of the zoom rotary ring 203. With this arrangement, when the zoom rotary ring 203 rotates about the optical axis O, the zoom rotary frame 204 is rotated about the optical axis O by the same angle as the zoom rotary ring 203. A first group cam groove 204*a* and a second group cam groove 204*b* are formed to the inner periphery side of the zoom rotary frame 204.

A cam follower 205*a* is engaged with the first group cam groove 204*a* of them, the cam follower 205*a* being fixed to a zoom first group frame 205 as a third frame (as well as a zoom frame) so as to project to the outer periphery side of the zoom first group frame 205.

A peripheral groove 205*b* (refer to FIG. 15) about the optical axis direction and a key groove 205*c* (refer to FIG. 16) in the optical axis direction are formed to the inner periphery side of the zoom first group frame 205, and a key groove 205*d* as second straight movement means (refer to FIG. 15) in the optical axis O direction is formed to the outer periphery side thereof, respectively. The peripheral groove 205*b* of them on the inner periphery side is formed in, for example, a partially arc shape along a peripheral direction and engaged with a partial projection 206*a* projecting to the outer periphery side of a male focus helicoid 206 as fourth frame means (as well as a focus frame). With this arrangement, the male focus helicoid 206 is moved forward and rearward integrally with the zoom first group frame 205 in the optical axis O direction as well as rotated relatively to the zoom first group frame 205 about the optical axis O.

The male focus helicoid 206 has a male helicoid 206*b* as first drive means formed to the front end side of the outer periphery thereof, a first group rear group frame guide cam groove 206*c* as second drive means formed around the inner periphery thereof, and a straight moving key groove 206*d* as a straight moving groove in the optical axis O direction formed to the rear side of the inner periphery thereof.

A key 207*a* is engaged with the straight moving key groove 206*d* of the male focus helicoid 206 so as to relatively move in the optical axis O direction, the key 207*a* being a key member (as well as focus drive means) on the distal end side of a focus coupling lever 207 as third drive means. The focus coupling lever 207 is rotated by a not shown AF motor about the optical axis O. Accordingly, when the focus coupling lever 207 is rotated about the optical axis O, the male focus helicoid 206 is also rotated about the optical axis O by the same angle as the focus coupling lever 207.

Further, a cam follower 208*a* as second drive means is engaged with the first group rear group frame guide cam groove 206c of the male focus helicoid 206, the cam follower 208a projecting from the outer periphery of a first group rear group frame 208 as a sixth frame (as well as a second moving frame, second frame means). The first group rear group frame 208 holds the first group lens rear group G1B, and a key groove 208b as third straight movement means in the optical axis O direction is formed to the front side of the outer periphery of the first group rear group frame 208.

Further, a female helicoid 209c as first drive means is screwed on the male helicoid 206b of the male focus helicoid 206, the female helicoid 209c being disposed to the inner periphery side of a female focus helicoid 209 as a fifth frame (as well as a first moving frame, first frame means). The female focus helicoid 209 is formed to have an approximately C-shaped cross section by coupling an outer peripheral cylindrical portion 209a with an inner peripheral cylindrical portion 209b on the front sides thereof so that they form a bottom. The zoom rotary frame 204 is interposed between the outer peripheral cylindrical portion 209a and the inner peripheral cylindrical portion 209b so that it is sandwiched between the portion having the approximately C-shaped cross section. The female focus helicoid 209 includes a straight moving guide key 209d as first straight movement means disposed in the optical axis O direction to the rear end side of the outer peripheral cylindrical portion 209a, a straight moving guide key 209e as second straight movement means disposed in the optical axis O direction to the rear end of the inner peripheral cylindrical portion 209b, and the female helicoid 209c disposed on the inner periphery side of the inner peripheral cylindrical portion 209b, respectively.

The straight moving guide key 209d of the outer peripheral cylindrical portion 209a of them is engaged with the key groove 202b of the fixed frame 202. With this arrangement, the female focus helicoid 209 can be moved forward and rearward in the optical axis O direction while the rotation thereof about the optical axis O being prevented.

Further, the straight moving guide key 209e of the inner peripheral cylindrical portion 209b of the female focus helicoid 209 is engaged with the key groove 205d on the outer periphery side of the zoom first group frame 205. With this arrangement, the female focus helicoid 209 prevents the rotation of the zoom first group frame 205 about the optical axis O while it can be relatively moved in the optical axis O direction with respect to the zoom first group frame 205.

A first group front group frame 210 as a fifth frame (as well as a first moving frame, first frame means) is fixed to the inner periphery side of the female focus helicoid 209 integrally therewith. The first group front group frame 210 holds the first group lens front group G1A and includes a straight moving guide key 210a in the optical axis O direction as third straight movement means disposed to the rear end side of the inner periphery thereof. The straight moving guide key 210a is engaged with the key groove 208b of the first group rear group frame 208. With this arrangement, the first group front group frame 210 prevents the rotation of the first group rear group frame 208 about the optical axis O while guiding the forward and rearward movement thereof in the optical axis O direction.

Further, an urging spring 211 is interposed between the first group front group frame 210 and the first group rear group frame 208 to urge them in a direction in which they are separated from each other. With this arrangement, the female helicoid 209c of the female focus helicoid 209 is abutted against the male helicoid 206b of the male focus helicoid 206 forward in the optical axis O direction through the first group front group frame 210 so as to eliminate backlash therebetween. Likewise, the cam follower 208a of the first group rear group frame 208 is abutted against the first group rear group frame guide cam groove 206c of the male focus helicoid 206 rearward in the optical axis O direction so as to eliminate backlash therebetween.

Further, the second group lens G2 is held by a second group frame 212. As shown in FIG. 16, the second group frame 212 is attached to a support frame 213 integrally therewith. The support frame 213 has a cam follower 213a fixed to an outer periphery side and a straight moving guide key 213b in the optical axis O direction.

The cam follower 213a of the support frame 213 is engaged with the second group cam groove 204b of the zoom rotary frame 204. Further, the straight moving guide key 213b of the support frame 213 is engaged with the key groove 205c of the zoom first group frame 205. With this arrangement, the rotation of the second group frame 212 and, in turn, the second group lens G2 about the optical axis O is prevented while they are guided so as to move in the optical axis O direction.

The third group lens G3 is held by a third group frame 214. The third group frame 214 is fixed to the fixed frame 202. Since the fixed frame 202 is fixed to the camera main body, and the like through the lens mount as described above, the third group lens G3 is fixed without being moved in any of the focusing operation and the zooming operation.

Next, an operation of the zoom lens barrel 201 arranged as described above will be explained.

First, the zoom lens barrel 201 operates as follows in the zooming operation.

When the zoom rotary ring 203 is rotated by a user, the zoom rotary frame 204 is rotated integrally with the zoom rotary ring 203.

Thus, the zoom first group frame 205 is moved forward and rearward in the optical axis O direction along the first group cam groove 204a formed to the inner periphery side of the zoom rotary frame 204 as well as the support frame 213 and the second group frame 212 are moved forward and rearward in the optical axis O direction along the second group cam groove 204b integrally with each other. At the time, the zoom first group frame 205 is only moved in the optical axis O direction without being rotated because the rotation thereof about the optical axis O is prevented by the straight moving guide key 209e of the female focus helicoid 209. Further, the second group frame 212 is also only moved in the optical axis O direction without being rotated because the rotation thereof about the optical axis O is prevented by the engagement of the straight moving guide key 213b of the support frame 213 with the key groove 205c of the zoom first group frame 205. With this operation, the second group frame 212 is moved forward and rearward in the optical axis O direction, that is, the second group lens 2G is moved forward and rearward in the optical axis O direction while the rotation thereof about the optical axis O being prevented.

When the zoom first group frame 205 is moved forward and rearward in the optical axis O direction while the rotation thereof about the optical axis O being prevented, the male focus helicoid 206 is moved forward and rearward in the optical axis O direction by the same amount as the zoom first group frame 205 by the engagement of the peripheral groove 205b of the zoom first group frame 205 with the partial projection 206a of the male focus helicoid 206. Accordingly, the female focus helicoid 209 and the first group front group frame 210, which are engaged with the male focus helicoid 206, and the first group rear group frame 208 are move forward and rearward while the rotation thereof about the optical axis O being prevented. With this operation, the first group lens front group G1A and the first group lens rear group G1B are move forward and rearward in the optical axis O direction by the same amount while the rotation hereof about the optical axis O being prevented. That is, in zooming, the first group lens front group G1A and the first group lens rear group G1B are move forward and rearward in the optical axis O direction integrally with each other.

Thus, in zooming, any of the first group lens G1, the second group lens G2, and the third group lens G3 execute the zooming operation without rotating about the optical axis O.

FIG. 17 shows how the respective lens groups are moved in the optical axis O direction by the zooming operation described above.

First, the third group lens G3 is not moved in the optical axis O direction as shown by a straight line 221 because it is fixed to the fixed frame 202 through the third group frame 214.

Next, as shown by a curved line 222, the second group lens G2 is monotonously extended as it moves from a wide end to a telescopic end.

Further, as shown in curved lines 223 and 224, when zooming-up begins from the wide end toward a telescopic side, after the first group lens G1 (first group lens rear group G1B and first group lens front group G1A) returns rearward once, it changes a moving direction so as to extend forward and is extended forward up to the telescopic end as it is.

Next, an operation in focusing (when focusing is executed to achieving a focused state) is as described below.

When the user half-depresses a shutter button, the not shown AF motor is rotated to thereby rotate the focus coupling lever 207 about the optical axis O.

With this operation, the male focus helicoid 206 is rotated about the optical axis O by the same amount as the focus coupling lever 207.

Accordingly, the female focus helicoid 209 is moved forward and rearward in the optical axis O direction by the action of the female helicoid 209c and the male helicoid 206b while the rotation hereof about the optical axis O being prevented by the engagement of the straight moving guide key 209d with the key groove 202b. With this operation, the first group front group frame 210 and, in turn, the first group lens front group G1A are moved forward and rearward in the optical axis O direction while the rotation hereof about the optical axis O being prevented.

At the same time, the first group rear group frame 208 is moved forward and rearward in the optical axis O direction by the action of the cam follower 208a and the first group rear group frame guide cam groove 206c while the rotation thereof about the optical axis O being prevented by the engagement of the key groove 208b with the straight moving guide key 210a. With this operation, the first group lens rear group G1B is moved forward and rearward in the optical axis O direction while the rotation hereof about the optical axis O being prevented.

Further, in focusing, the second group lens G2 and the third group lens G3 are not driven. Accordingly, in focusing, any of the first group lens front group G1A, the first group lens rear group G1B, and the second group lens G2 and the third group lens G3 which are not driven, is not rotated about the optical axis O.

FIG. 17 shows how the respective lens groups are moved in the optical axis O direction by the focusing operation described above.

As described above, the second group lens G2 and the third group lens G3 are not moved in the focusing operation.

Next, although the first group lens G1 is moved forward and rearward in the optical axis O direction in the focusing operation, a moving amount in the optical axis O direction at the time is different in the first group lens front group G1A and in the first group lens rear group G1B. That is, the zoom lens barrel 201 is arranged as a so-called floating lens.

In FIG. 17, a curved line 224 shows the position of the first group lens front group G1A when zooming is executed by setting a focusing position to the infinite position, a curved line 224a shows the position thereof when zooming is executed by setting a focusing position to the nearest position, a curved line 224b shows the position thereof when zooming is executed by setting a focusing position to an adjustment margin end exceeding the infinite position, respectively. Accordingly, ordinarily, when an image is picked up, the first group lens front group G1A is stopped between the curved line 224 and the curved line 224a to adjust a focal point.

Likewise, in FIG. 17, a curved line 223 shows the position of the first group lens rear group G1B when zooming is executed by setting a focusing position to the infinite position, a curved line 223a shows the position thereof when zooming is executed by setting a focusing position to the nearest position, a curved line 223b shows the position thereof when zooming is executed by setting a focusing position to the adjustment margin end exceeding the infinite position, respectively. Accordingly, ordinarily, when an image is picked up, the first group lens rear group G1B is stopped between the curved line 223 and the curved line 223a to adjust the focal point.

According to the second embodiment arranged as described above, any of the lenses constituting the image pickup lens is not rotated about the optical axis O in any of the zooming operation and the focusing operation. Therefore, even if the aspherical lenses are included, an optical performance is not deteriorated. Specifically, the first group lens rear group G1B including the lens L4 as the aspherical lens is not rotated about the optical axis O as well as the second group lens G2 including the lens L10 as the aspherical lens is not also rotated about the optical axis O, thereby the optical performance is not deteriorated.

Further, since the first group lens front group G1A nearest to a subject side is not rotated about the optical axis O, even if a lens hood having a complex shape is attached, the lens hood is not also rotated, thereby the lens hood can achieve a predetermined function.

According to the zoom lens barrel 201 arranged as described above, any of the lenses is not rotated although it has a simple arrangement employing the floating mechanism which permits the plurality of lens groups to be moved forward and rearward in a different direction or in a different amount in focusing. Thus, the zoom lens barrel 201 is suitable to use the asymmetrical lenses and the lens hood having the complex shape.

The zoom lens barrel according to the present invention can be utilized as a zoom lens barrel which can cope with a forward and rearward movement required in zooming and focusing and can realize miniaturization of the lens barrel.

The present invention is by no means limited to the embodiments described above, and various modifications can be embodied in an execution phase within the range which does not depart from the gist of the invention. Further, since the respective embodiments include inventions in various phases, various inventions can be extracted by appropriately combining the plurality of disclosed constituents.

For example, even if some constituents are deleted from all the constituents shown in the respective embodiments, an arrangement from which the constituents are deleted can be extracted as an invention when the problems described in the paragraph of the problems to be solved by the invention can be solved and the advantages described in the paragraph of the advantages of the invention can be obtained.

What is claimed is:

1. A zoom lens barrel comprising:
    a first frame;
    a second frame rotating relatively to the first frame;
    a third frame moved in an optical axis direction by the rotation of the second frame;
    a fourth frame moved in the optical axis direction together with the third frame and capable of rotating relatively to the third frame;
    a fifth frame moved in the optical axis direction by the rotation of the fourth frame;
    a sixth frame moved in the optical axis direction by the rotation of the fourth frame;
    first straight movement means disposed to the first frame and to the fifth frame to prevent the fifth frame from rotating;
    second straight movement means to prevent the third frame from rotating;
    first drive means disposed to the fourth frame and to the fifth frame to drive the fifth frame with respect to the fourth frame in the optical axis direction;
    second drive means disposed to the fourth frame and to the sixth frame to drive the sixth frame in the optical axis direction in an amount different from an amount of the fifth frame;
    third straight movement means disposed to the fifth frame and to the sixth frame to prevent the sixth frame from rotating; and
    third drive means for rotating the fourth frame while being rotated about an optical axis and for driving the fifth frame and the sixth frame in the optical axis direction by driving the first drive means and the second drive means.

2. A zoom lens barrel according to claim 1, wherein the second straight movement means is disposed to the first frame and to the fifth frame.

3. A zoom lens barrel according to claim 1, wherein the second straight movement means is disposed to the third frame and to the fifth frame.

4. A zoom lens barrel according to claim 1, wherein the third frame has a peripheral groove, and the fourth frame has an engaging portion engaged with the peripheral groove and sliding therein.

5. A zoom lens barrel according to claim 4, wherein the engaging portion is a cam follower.

6. A zoom lens barrel according to claim 4, wherein the engaging portion is a peripheral rib.

7. A zoom lens barrel according to claim 1, wherein the first drive means comprises a cam and a cam follower engaged therewith.

8. A zoom lens barrel according to claim 7, wherein the cam is disposed to the fifth frame, and the cam follower is disposed to the fourth frame.

9. A zoom lens barrel according to claim 1, wherein the first drive means comprises a helicoid screw.

10. A zoom lens barrel according to claim 1, wherein the second drive means comprises a cam and a cam follower engaged therewith.

11. A zoom lens barrel according to claim 10, wherein the cam is disposed to the sixth frame, and the cam follower is disposed to the fourth frame.

12. A zoom lens barrel according to claim 10, wherein the cam is disposed to the fourth frame, and the cam follower is disposed to the sixth frame.

13. A zoom lens barrel according to claim 1 further comprising:
    a focusing drive ring comprising a straight moving key parallel with the optical axis and extending in the optical axis direction, wherein a straight moving groove disposed to the fourth frame in parallel with the optical axis is engaged with the straight moving key.

14. A zoom lens barrel comprising:
    a first lens group for constituting a zoom lens and also executing focusing;
    a second lens group for constituting a zoom lens and also executing focusing;
    first frame means for holding the first lens group and having first movement means for driving the first lens group in an optical axis direction for focusing;
    second frame means for holding the second lens group and having second movement means for driving the second lens group in the optical axis direction in an amount different from an amount of the first lens group for focusing;
    third frame means having third movement means for moving the first frame means and the second frame means together in the optical axis direction for executing zooming and having a peripheral groove disposed in a peripheral direction to move the first frame means and the second frame means in the optical axis direction by the third movement means;
    fourth frame means for supporting the first lens group and the second lens group, the fourth frame means having portions with which the first movement means, the second movement means, and the peripheral groove are engaged, moving the first frame means and the second frame means in the optical axis direction in a different amount, respectively in focusing, and moving the first lens group and the second lens group together in the optical axis direction in zooming;
    zoom drive means for driving the third frame means to move the peripheral groove in the optical axis direction and to move the first frame means and the second frame means together in the optical axis direction for executing zooming; and
    focus drive means for driving the fourth frame means in rotation to move the first frame means and the second frame means in the optical axis direction in a relatively different amount for focusing.

15. A zoom lens barrel according to claim 14, wherein the first movement means includes a cam.

16. A zoom lens barrel according to claim 14, wherein the first movement means includes a helicoid screw.

17. A zoom lens barrel according to claim 14, wherein the second movement means includes a cam.

18. A zoom lens barrel according to claim 14 further comprising a rotary cam frame which supports the third frame means around the inner periphery thereof.

19. A zoom lens barrel according to claim 14, wherein the fourth frame means is driven in rotation about an optical axis in focusing by the focus drive means and is guided straight by a key member extending in parallel with the optical axis.

20. A zoom lens barrel according to claim 14, wherein the first movement means and the second movement means comprise a cam, respectively and incline oppositely with respect to the optical axis.

* * * * *